(12) United States Patent
Takamatsu et al.

(10) Patent No.: US 10,224,585 B2
(45) Date of Patent: Mar. 5, 2019

(54) BATTERY HEAT RADIATION SYSTEM, BATTERY HEAT RADIATION UNIT

(71) Applicant: KABUSHIKI KAISHA TOSHIBA, Tokyo (JP)

(72) Inventors: Tomonao Takamatsu, Kanagawa (JP); Mitsunobu Yoshida, Kanagawa (JP); Nobukatsu Sugiyama, Kanagawa (JP); Ryosuke Yagi, Kanagawa (JP); Norihiro Tomimatsu, Tokyo (JP); Katsumi Hisano, Chiba (JP); Hideo Shimizu, Saitama (JP); Masahiro Sekino, Tokyo (JP); Toshinori Uchida, Tokyo (JP); Nagaaki Muro, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 331 days.

(21) Appl. No.: 15/066,537

(22) Filed: Mar. 10, 2016

(65) Prior Publication Data

US 2016/0268655 A1 Sep. 15, 2016

Related U.S. Application Data

(63) Continuation of application No. PCT/JP2014/074118, filed on Sep. 11, 2014.

(30) Foreign Application Priority Data

Sep. 20, 2013 (JP) .................................. 2013-196209

(51) Int. Cl.
*H01M 10/6551* (2014.01)
*H01M 10/6552* (2014.01)
(Continued)

(52) U.S. Cl.
CPC .... *H01M 10/6551* (2015.04); *F28D 15/0275* (2013.01); *H01M 10/613* (2015.04);
(Continued)

(58) Field of Classification Search
CPC ......... H01M 10/6551; H01M 10/6552; H01M 10/6563; H01M 10/613
See application file for complete search history.

(56) References Cited

U.S. PATENT DOCUMENTS

2012/0148881 A1 6/2012 Quisenberry

FOREIGN PATENT DOCUMENTS

| DE | 1921748 | 11/1970 |
|---|---|---|
| JP | 5-244771 | 9/1993 |

(Continued)

OTHER PUBLICATIONS

Machine Translation of: JP 2009-152440, Matsumoto et al., Jul. 9, 2009.*

(Continued)

*Primary Examiner* — Kenneth J Douyette
(74) *Attorney, Agent, or Firm* — Finnegan, Henderson, Farabow, Garrett & Dunner, L.L.P.

(57) ABSTRACT

Each of the plurality of battery heat radiation units includes, a battery module, at least one heat pipe thermally connected at a first end of the heat pipe to one surface of the battery module and protruding from the battery module at a second end of the heat pipe, at least one metal heat exchanger plate thermally connected to one surface of the battery module, and at least one heat radiation portion provided at the second end of the heat pipe, the air blowing portion blows air to the heat radiation portion, and one heat radiation portion in the plurality of battery heat radiation units is misaligned with other heat radiation portions in the plurality of battery heat radiation units as viewed from the air blowing portion side.

4 Claims, 19 Drawing Sheets

(51) Int. Cl.
    *H01M 10/6563*    (2014.01)
    *H01M 10/6554*    (2014.01)
    *H01M 10/613*     (2014.01)
    *H01M 10/6557*    (2014.01)
    *H01M 10/625*     (2014.01)
    *H01M 10/6567*    (2014.01)
    *F28D 15/02*     (2006.01)

(52) U.S. Cl.
    CPC ..... *H01M 10/625* (2015.04); *H01M 10/6552* (2015.04); *H01M 10/6554* (2015.04); *H01M 10/6557* (2015.04); *H01M 10/6563* (2015.04); *H01M 10/6567* (2015.04); *H01M 2220/20* (2013.01)

(56) References Cited

FOREIGN PATENT DOCUMENTS

| | | |
|---|---|---|
| JP | 7-30450 | 6/1995 |
| JP | 9-326264 | 12/1997 |
| JP | 2001-52765 | 2/2001 |
| JP | 2001-243993 | 9/2001 |
| JP | 2005-78970 | 3/2005 |
| JP | 2005-276918 | 10/2005 |
| JP | 2005-285456 | 10/2005 |
| JP | 2005-349955 | 12/2005 |
| JP | 2007-12486 | 1/2007 |
| JP | 2009-152440 | 7/2009 |
| JP | 2011-124025 | 6/2011 |
| JP | 2011-243358 | 12/2011 |
| JP | 2012-134101 | 7/2012 |
| JP | 2012-147970 | 9/2012 |
| JP | 5089814 | 9/2012 |
| JP | 2012-253191 | 12/2012 |
| WO | WO-2012/020614 | 2/2012 |

OTHER PUBLICATIONS

Machine Translation of: JP 2012-134101, Motohashi et al., Jul. 12, 2012.*

Machine Translation of: JP 2011-124025, Satake, Jun. 23, 2011.*

English-language International Search Report from the Japanese Patent Office for International Application No. PCT/JP2014/074118 dated Dec. 16, 2014.

* cited by examiner

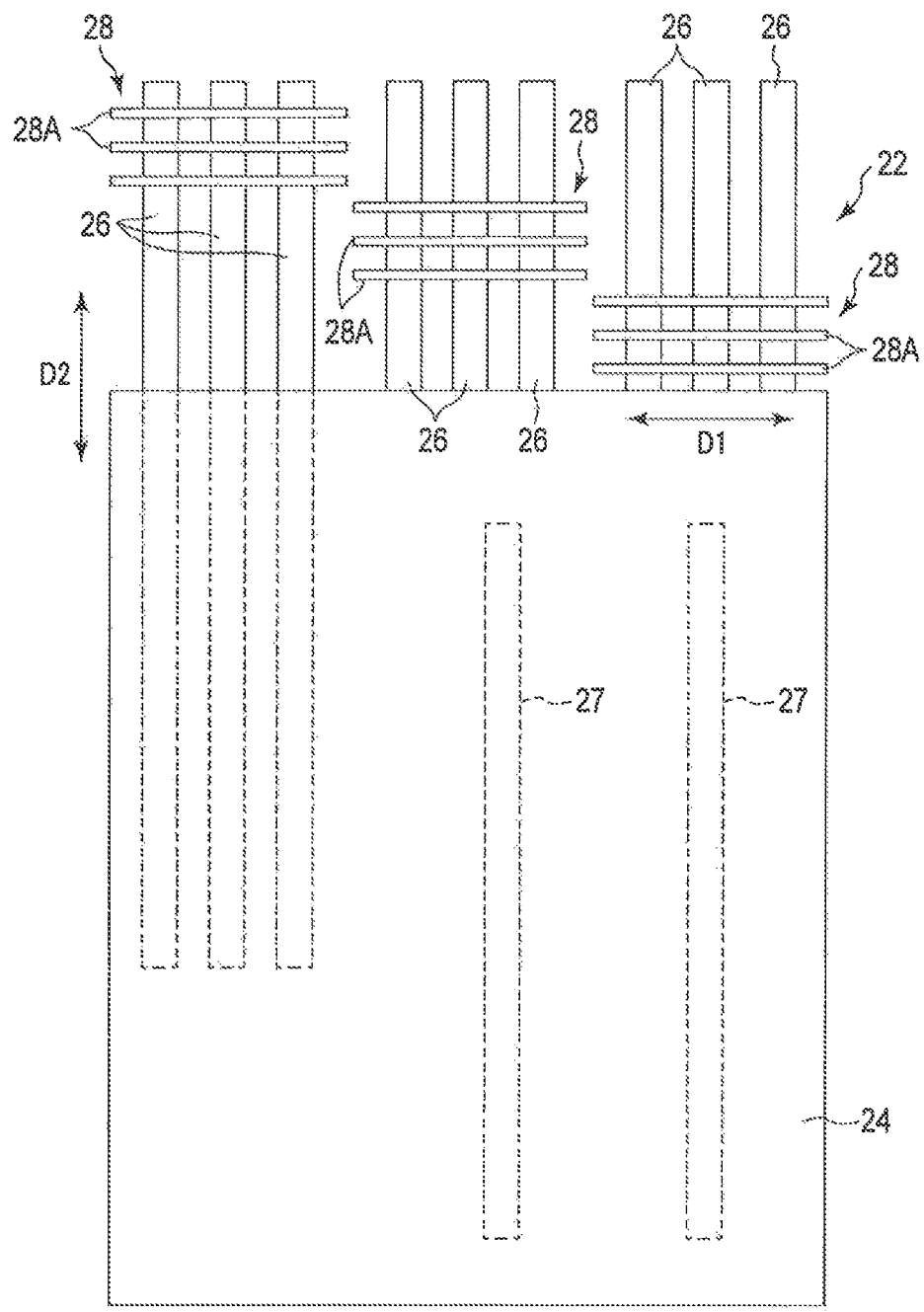
F I G. 8

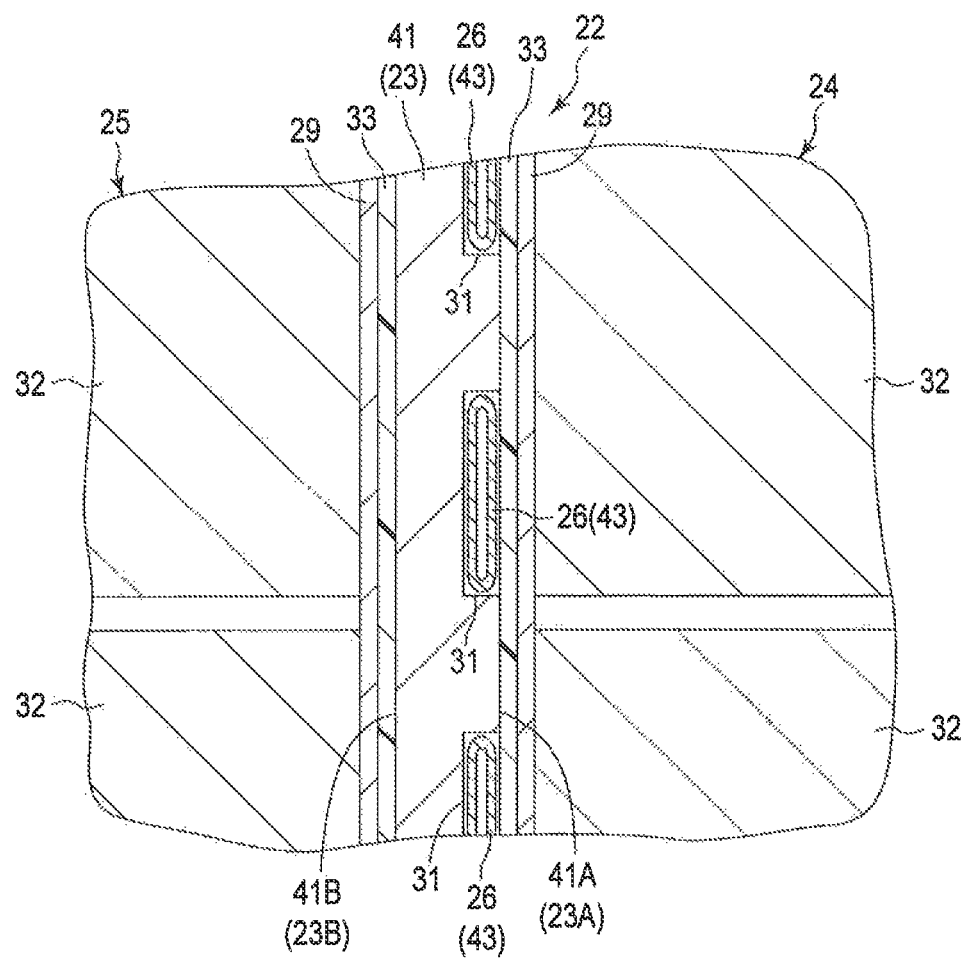
F I G. 11

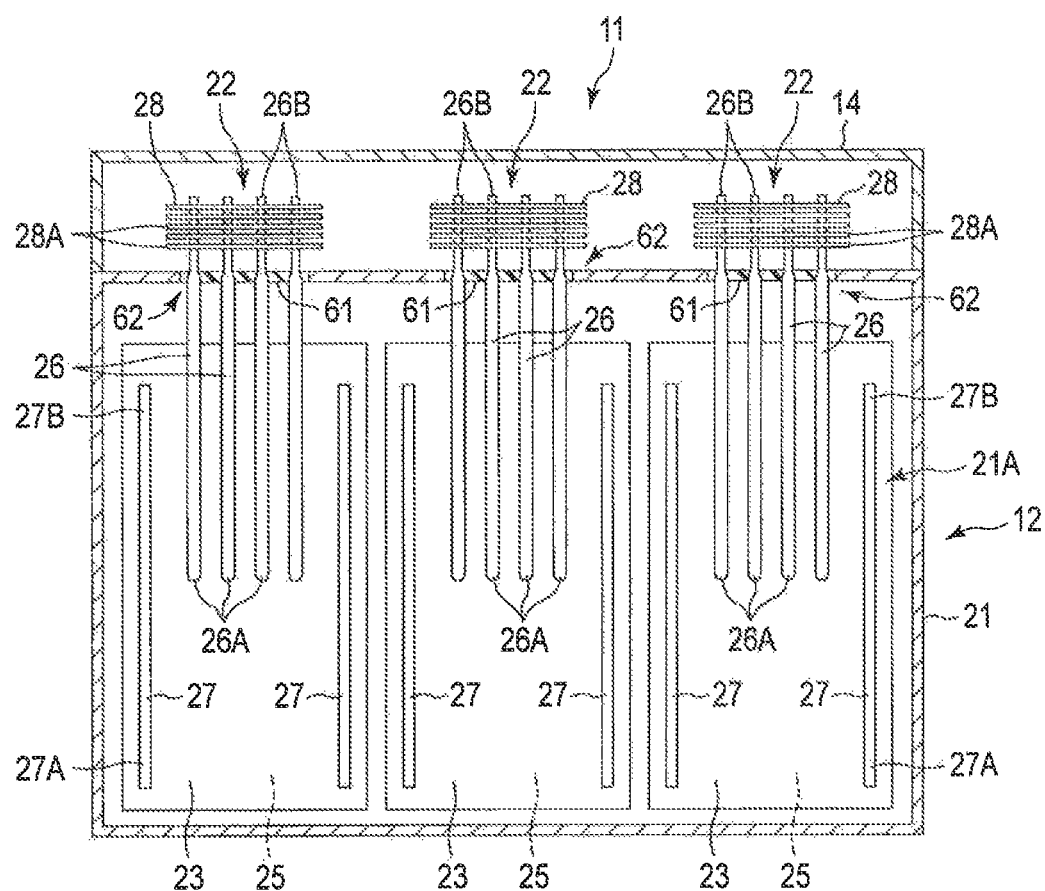
F I G. 15

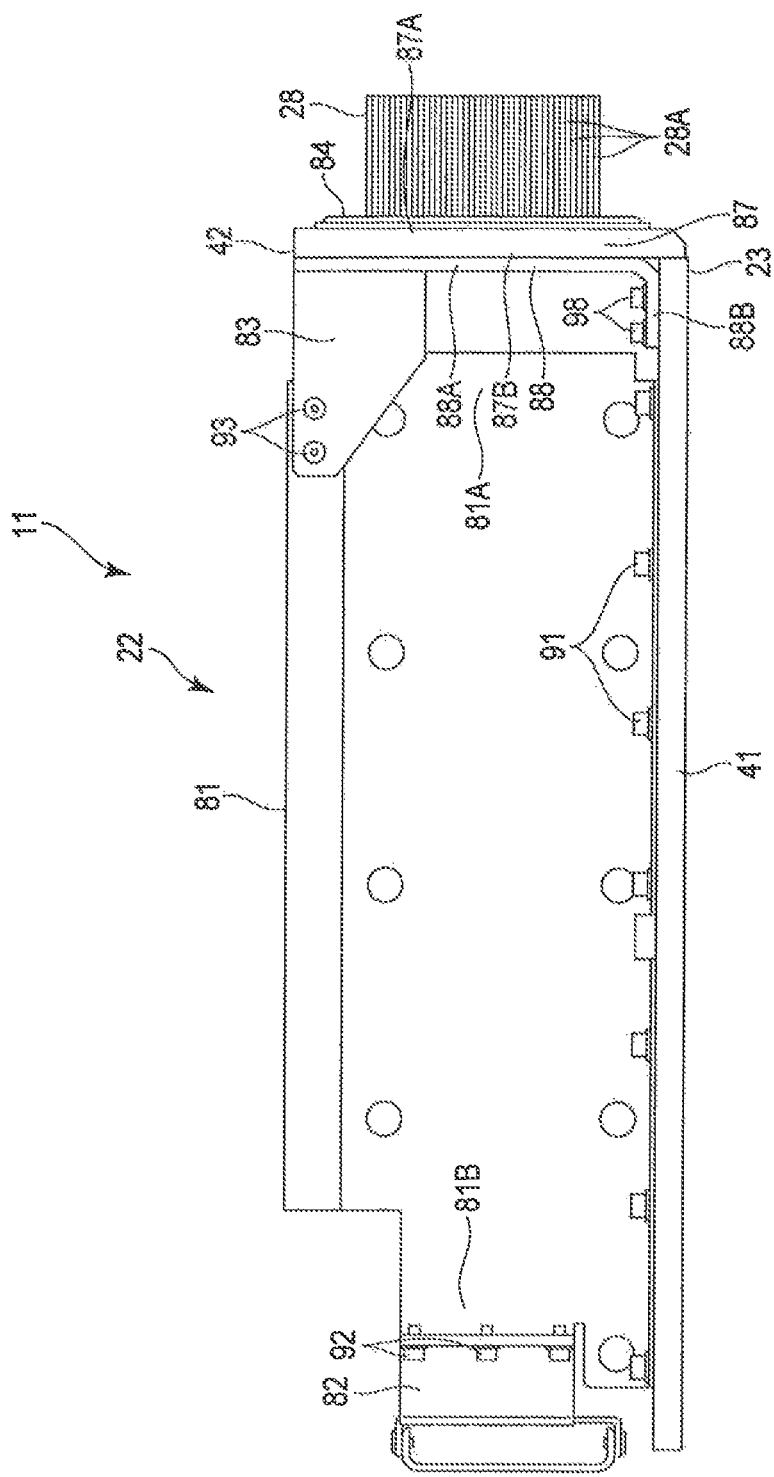
F I G. 19

US 10,224,585 B2

BATTERY HEAT RADIATION SYSTEM, BATTERY HEAT RADIATION UNIT

CROSS-REFERENCE TO RELATED APPLICATION

This application is a Continuation Application of PCT Application No. PCT/JP2014/074118, filed Sep. 11, 2014 and based upon and claiming the benefit of priority from Japanese Patent Application No. 2013-196209, filed Sep. 20, 2013; the entire contents of which are incorporated herein by reference.

FIELD

Embodiments of the present invention relate to a battery heat radiation system comprising a battery module and a heat radiation portion.

BACKGROUND

For secondary batteries, shortening a charging time is an important element for improving convenience for users. A method of charging at night for several hours as in the conventional art precludes equipment that uses the secondary battery from being used the next day if the user forgets to do the charging at night. Similarly, the method of charging for several hours needs a secondary battery of sufficient capacity to store daily electricity, leading to an increased volume of the secondary battery. On the other hand, secondary batteries that can be rapidly charged can be charged immediately before use.

For secondary batteries used for electric cars, shortening a charging time is also an important element for improving convenience for users. Enabling the charging time to be shortened allows the capacity of the secondary battery mounted in the electric car to be reduced in areas where charging stations are installed at regular intervals. Moreover, a delay in infrastructure development for charging stations has been a challenge to electric cars, and enabling the charging time to be shortened reduces a waiting time for charging, promoting installation of charging stations.

BRIEF DESCRIPTION OF THE DRAWINGS

FIG. 8 is a front view depicting a modification of the battery heat radiation unit in the battery heat radiation system in the second embodiment.

FIG. 11 is a sectional view of the module unit depicted in FIG. 10, the view being taken along line F11-F11.

FIG. 15 is a sectional view of a battery heat radiation system in a fourth embodiment taken along the vertical direction.

FIG. 19 is a side view depicting the battery heat radiation unit depicted in FIG. 18, the view being depicted from a side direction.

DETAILED DESCRIPTION

First Embodiment

According to embodiment, a battery heat radiation system comprising, a plurality of battery heat radiation units, and an air blowing portion. Each of the plurality of battery heat radiation units comprises, a battery module, at least one heat pipe thermally connected at a first end of the heat pipe to one surface of the battery module and protruding from the battery module at a second end of the heat pipe, at least one metal heat exchanger plate thermally connected to one surface of the battery module, and at least one heat radiation portion provided at the second end of the heat pipe. The air blowing portion blows air to the heat radiation portion, and one heat radiation portion in the plurality of battery heat radiation units is misaligned with other heat radiation portions in the plurality of battery heat radiation units as viewed from the air blowing portion side.

With reference to FIGS. 1 to 4, a first embodiment of a battery heat radiation system will be described below.

Figure 1:
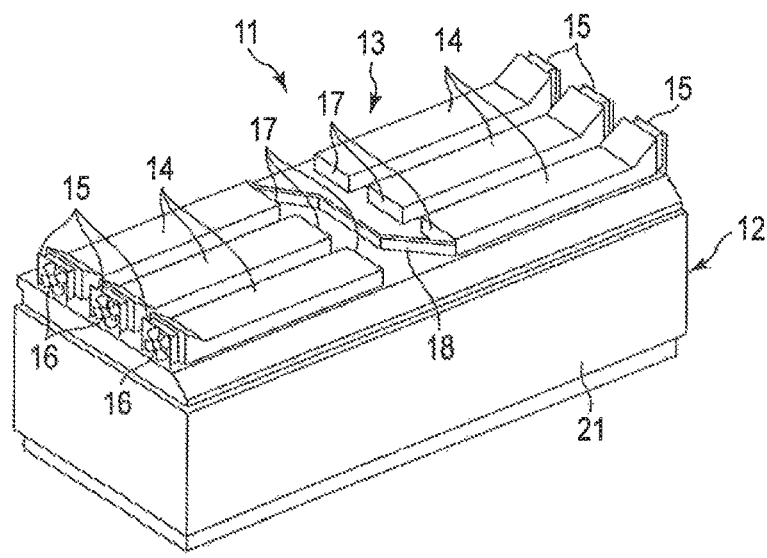
FIG. 1 is a perspective view depicting an appearance of a battery heat radiation system in a first embodiment.

As depicted in FIG. 1, a secondary battery pack (battery pack) to which the battery heat radiation system is applied can provide any battery capacity according to an application when a plurality of battery modules (secondary battery modules) are housed inside the pack. The secondary battery pack for which the battery heat radiation system is adopted is mainly used for moving vehicles such as electric cars.

A battery heat radiation system 11 comprises a secondary battery pack 12 and a cooling unit 13 mounted at a top of the secondary battery pack 12.

Figure 2:
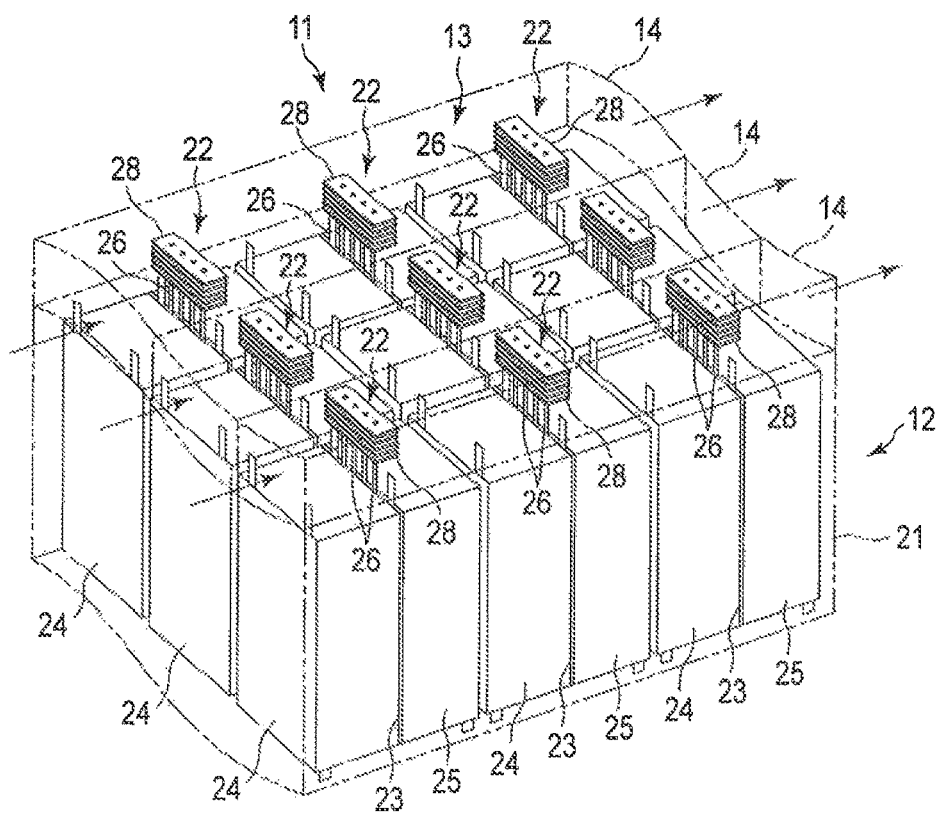
FIG. 2 is a perspective view depicting an inside of the battery heat radiation system depicted in FIG. 1.

The cooling unit 13 comprises a plurality of duct portions 14 attached to an upper portion of the secondary battery pack 12, a plurality of air blowing portions 16 provided at inlets 15 of the duct portions 14, and a partition wall 18 provided between outlets 17 of the duct portions 14. As depicted in FIG. 2, a plurality of heat radiation portions 28 described below are linearly housed inside each of the duct portions 14 such that the heat radiation portions 28 are spaced at intervals. Each of the air blowing portions 16 comprises a fan unit including a rotatable fan. The air blowing portion 16 allows air (cooling air) from an external environment to be blown from the inlet 15 toward the outlet 17 of the duct portion 14.

As depicted in FIG. 1 and FIG. 2, the secondary battery pack 12 comprises a case forming a shell, and a plurality of battery heat radiation units 22 housed in the case 21.

Figure 3:
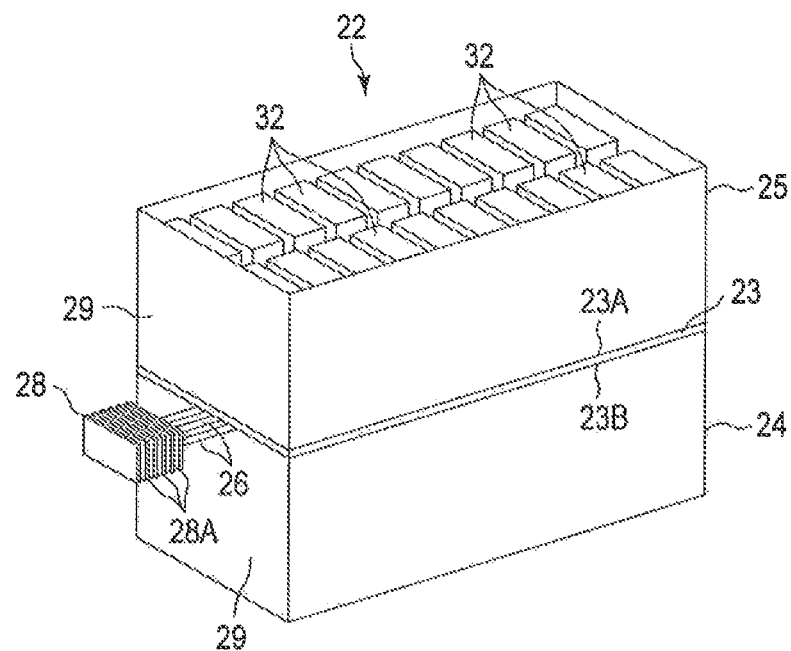
FIG. 3 is perspective view depicting a battery heat radiation unit housed inside the battery heat radiation system depicted in FIG. 2.

As depicted in FIG. 2 and FIG. 3, each of the battery heat radiation units 22 comprises a heat exchanger plate 23, a first battery module 24 fixed and thermally connected to a first surface 23A of the heat exchanger plate 23, a second battery module 25 fixed and thermally connected to a second surface 23B of the heat exchanger plate 23, first heat pipes 26 thermally connected to the first battery module 24 and the second battery module 25 via the heat exchanger plate 23, second heat pipes 27 fixed to the heat exchanger plate 23, and a heat radiation portion 28 provided at second ends described below of the first heat pipes 26.

Figure 4:
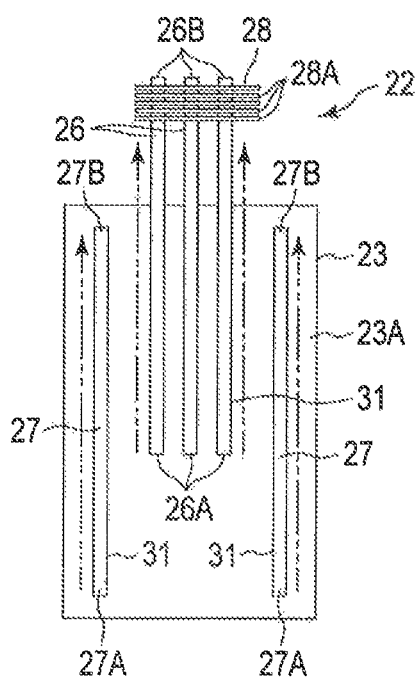
FIG. 4 is a front view depicting a heat exchanger plate, first heat pipes, second heat pipes, and a heat radiation portion in the battery heat radiation unit depicted in FIG. 3.

As depicted in FIG. 4, the heat exchanger plate 23 is formed of a highly-heat-conductive metal such as copper or aluminum. The heat exchanger plate 23 has a plurality of recessed portions 31 on the first surface 23A side such that first ends 26A of the first heat pipes 26 and the entire second heat pipes 27 can be housed in the recessed portions 31. Thus, a surface defined by the first ends 26A of the first heat pipes 26 and the second heat pipes 27 is substantially equal in height to the first surface 23A of the heat exchanger plate 23 located around each of the recessed portions 31 (see FIG. 11). Consequently, heat receiving flat surfaces are formed on the opposite surfaces of the heat exchanger plate 23.

As depicted in FIG. 3, the second battery module 25 has the same structure as that of the first battery module 24. The first battery module 24 (second battery module 25) comprises a box-like module case 29, and a plurality of battery cells 32 provided in the module case 29. Each of the battery cells 32 is fixed to a bottom (bottom surface) of the module case 29 by bonding, screwing, or the like. The battery cells 32 are electrically connected together by wiring. The module case 29 is formed of, for example, a metal material, but may be made of a synthetic resin.

The first battery module 24 is thermally connected to the heat exchanger plate 23 on a wall portion (bottom surface) of the module case 29 to which all the battery cells 32 are secured. Thus, in other words, the first battery module 24 is secured to the heat exchanger plate 23 on the wall surface of the module case 29 at which distances from all the battery cells 32 are equal.

Similarly, the second battery module 25 is thermally connected to the heat exchanger plate 23 on the wall portion (bottom surface) of the module case 29 to which all the battery cells 32 are secured. Thus, in other words, the second battery module 25 is secured to the heat exchanger plate 23 on the wall surface of the module case 29 at which distances from all the battery cells 32 are equal.

The first heat pipes 26 and the second heat pipes 27 each comprise a tubular heat pipe main body formed of copper and in which a working fluid capable of phase changes between a gas and a liquid is sealed. For example, water is used as the working fluid, but for example, alcohol or any other liquid may be used as the working fluid.

As depicted in FIG. 4, the first heat pipes 26 extend along a longitudinal direction of the first battery module 24 and the second battery module 25 (or the heat exchanger plate 23). Each of the first heat pipes 26 comprises the first end 26A, which overlaps the first battery module 24 and the second battery module 25 (or the heat exchanger plate 23), and a second end 26B protruding from the first battery module 24 and the second battery module 25 (or the heat exchanger plate 23). The first end 26A of the first heat pipe 26 is fixed and thermally connected to the heat exchanger plate 23 by means of, for example, soldering, caulking, or brazing.

The first end 26A has an elliptical sectional shape that is flat in a thickness direction of the heat exchanger plate 23 (see FIG. 11) so as to increase the area of contact with the first battery module 24 and the heat exchanger plate 23. The first heat pipe 26 allows heat received at the first end 26A from the first battery module 24 and the second battery module 25 (or the heat exchanger plate 23) to be efficiently transported to the heat radiation portion 28 located at the second end 26B.

Each of the second heat pipes 27 extends along the longitudinal direction of the first battery module 24 and the second battery module 25 (or the heat exchanger plate 23). The second heat pipe 27 comprises a first end 27A positioned opposite to a direction in which the heat radiation portion 28 is located and a second end 27B positioned in the direction in which the heat radiation portion 28 is located. Like the first heat pipe 26 depicted in FIG. 11, the second heat pipe 27 is shaped to have an elliptic section that is flat in the thickness direction of the heat exchanger plate 23 (see FIG. 11) so as to increase the area of contact with the first battery module 24 and the heat exchanger plate 23.

As depicted in FIG. 3 and FIG. 4, the heat radiation portion 28 comprises a plurality of plate-like fins 28A arranged at regular intervals in the direction in which the first heat pipes 26 extend.

A heat conducting sheet 33 having elasticity similar to the elasticity of rubber is interposed between the heat exchanger plate 23 and the first battery module 24 (see FIG. 11). The heat conducting sheet 33 enhances adhesion between the heat exchanger plate 23 and the first battery module 24 and reduces heat resistance between the heat exchanger plate 23 and the first battery module 24. Similarly, for example, a heat conducting sheet 33 having elasticity similar to the elasticity of rubber is interposed between the heat exchanger plate 23 and the second battery module 25 (see FIG. 11). The heat conducting sheet 33 enhances adhesion between the heat exchanger plate 23 and the second battery module 25 and reduces heat resistance between the heat exchanger plate 23 and the second battery module 25. The heat conducting sheets 33 are formed of, for example, a synthetic resin material. Instead of the heat conducting sheets 33, heat-conductive grease may be used to enhance the adhesion.

With reference to FIG. 4 and other figures, a cooling effect of the battery heat radiation unit 22 in the battery heat radiation system 11 in the first embodiment will be described.

When charging or the like is rapidly performed on a large number of the battery cells 32 using a charging apparatus, the battery cells 32 generate heat. Part of the heat generated by the battery cells 32 (first battery modules 24 and second battery modules 25) is transmitted to the heat exchanger plate 23, from which the heat is transmitted to the first heat pipes 26, or during the transmission, the heat is transmitted to the first heat pipes 26 via the second heat pipes 27. Alternatively, part of the heat generated by the battery cells 32 is transmitted directly to the first heat pipes 26. Due to high heat-conducting performance of the heat pipes, the heat transmitted to the first heat pipes 26 is efficiently transmitted from the first end 26A to the second end 26B, where the heat radiation portion 28 is located. On the other hand, the air blowing portion 16 blows cooling air to the duct portion 14 as depicted by arrows in FIG. 2, and the cooling air draws heat from the heat radiation portion 28 which is exposed to the duct. Thereby the heat radiation portion 28 is cooled. In this manner, the heat generated by the battery modules (each battery cell 32) is released to the external environment through the outlets 17 of the duct portions 14.

According to the first embodiment, the battery heat radiation system 11 comprises the plurality of battery modules, the plurality of heat pipes thermally connected at the first ends 26A to one surface of each of the battery modules and protruding from the battery module at the second ends 26B, the plurality of heat radiation portions 28 provided at the second ends 26B of the heat pipes, and the air blowing portion 16 that blows air to the plurality of heat radiation portions 28.

This configuration allows the heat generated by the battery modules to be released to the external environment via the heat radiation portions 28. Consequently, the battery modules can be prevented from becoming hot during charging in a reduced time, or during what is called rapid charging. This inhibits the battery cells 32 from being degraded early and prevents an increase in resistance, leading to enhanced reliability of the battery modules.

Figure 5:
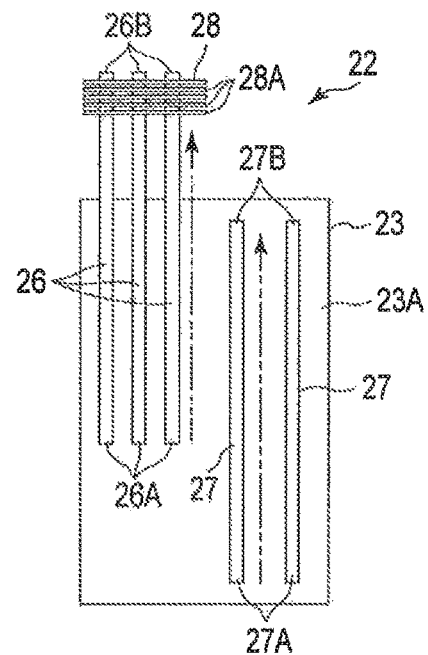
FIG. 5 is a front view depicting a first modification of the battery heat radiation unit in the first embodiment depicted in FIG. 4.
Figure 6:
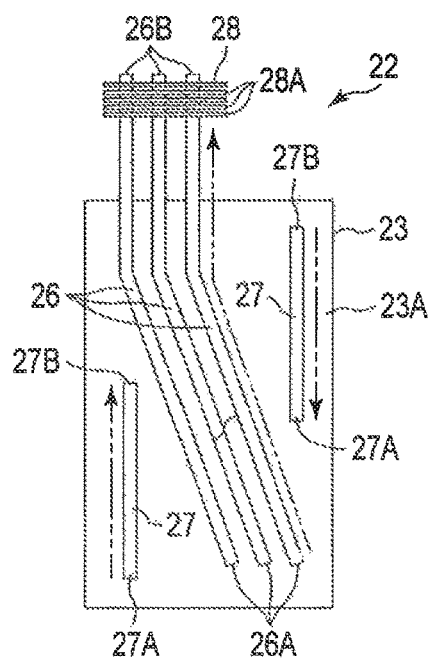
FIG. 6 is a front view depicting a second modification of the battery heat radiation unit in the first embodiment depicted in FIG. 4.

The arrangement of the first heat pipes 26, the second heat pipes 27, and the heat radiation portion 28 may be modified as depicted in FIG. 5 and FIG. 6. That is, as depicted in FIG. 5, the first heat pipes 26 and the heat radiation portion 28 may all be arranged in a left side of FIG. 5, whereas the second heat pipes 27 may all be arranged in a right side of FIG. 5. Furthermore, as depicted in FIG. 6, the first heat pipes 26 may be arranged in a diagonal direction of the heat exchanger plate 2, with the first heat pipes 26 partly folded, and the heat radiation portion 28 may be arranged in the left in FIG. 6. In this case, the second heat pipes 27 may be arranged at a lower left position and an upper right position in FIG. 6. Adoption of the modifications in FIG. 5 and FIG. 6 allow the position of the heat radiation portion 28 to be changed as needed.

In the structures of the modifications, part of the heat generated by the battery cells 32 is also transmitted to the heat exchanger plate 23, and during the transmission, the heat is efficiently transmitted to the heat radiation portion 28 via the second heat pipes 27 and the first heat pipes 26. Consequently, the first battery module 24 and the second battery module 25 are efficiently cooled. Moreover, inside each of the battery modules, a possible variation in temperature (temperature unevenness) among the battery cells 32 can be prevented, allowing the temperature to be made uniform among all the battery cells 32 in the battery module.

Second Embodiment

Figure 7:
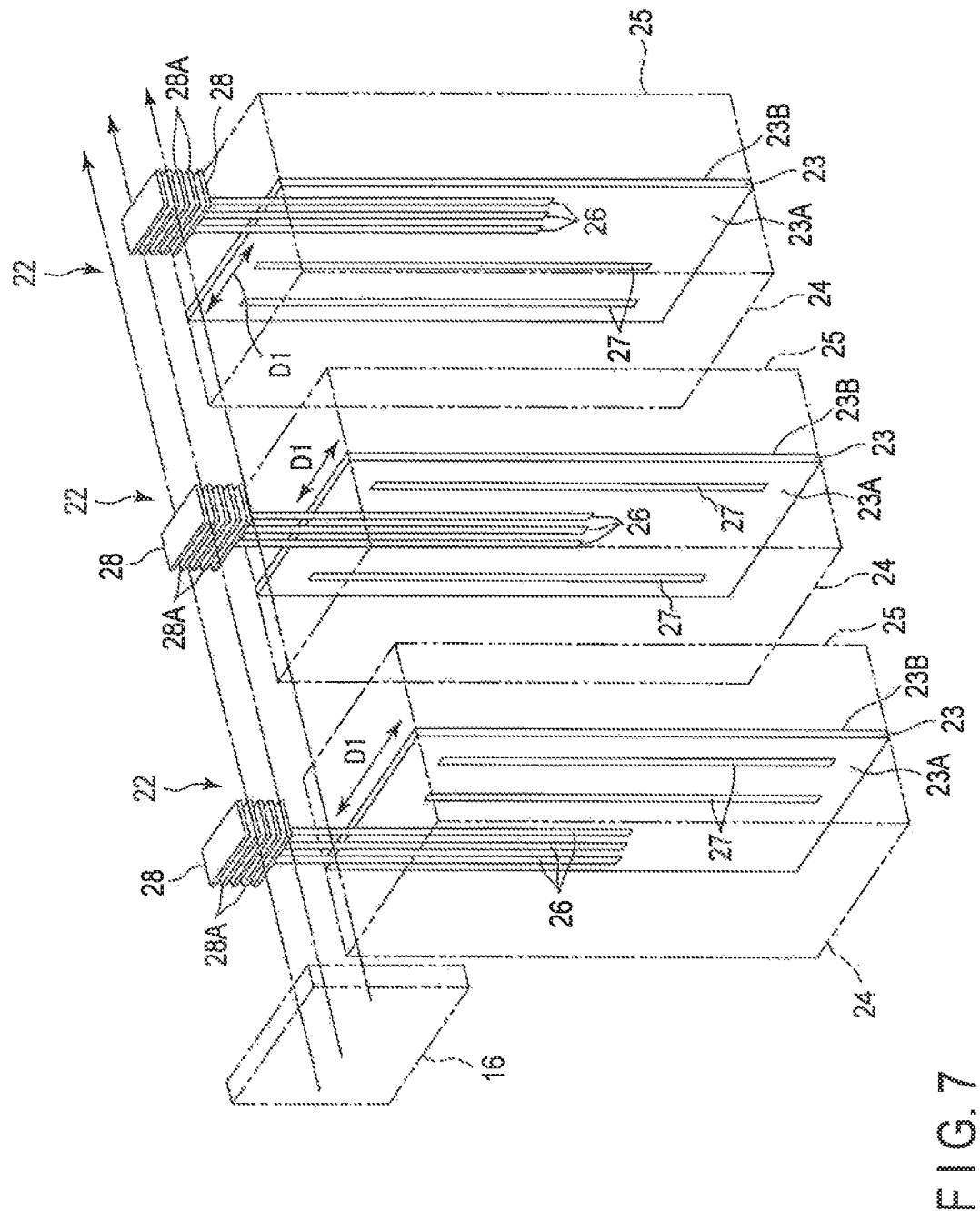
FIG. 7 is a perspective view depicting the structure of each battery heat radiation unit in a battery heat radiation system in a second embodiment.

With reference to FIG. 7, a second embodiment of the battery heat radiation system 11 will be described below. The battery heat radiation system 11 in the present embodiment is the same as the battery heat radiation system 11 in the first embodiment except that the arrangement of the first heat pipes 26, the second heat pipes 27, and the heat radiation portion 28 is different. Thus, the parts that are different will mainly be described below, and the parts that are the same are denoted by the same reference numerals and will not be described.

The one heat radiation portion 28 of the plurality of heat radiation portions 28 are misaligned with the other heat radiation portions 28 of the plurality of heat radiation portions 28, in a direction D1 crossing (is orthogonal to) the direction in which the first heat pipes 26 protrude from the first battery module 24 and extending along the heat exchanger plate 23, as viewed from the air blowing portion 16 side. That is, in the present embodiment, one heat radiation portion 28 is misaligned with the other heat radiation portions 28 in what is called a lateral direction.

In the present embodiment, the arrangement of the first heat pipes 26 and the second heat pipes 27 varies among the battery heat radiation units 22. In FIG. 7, for example, in the battery heat radiation unit 22 located at a leftmost position, the first heat pipes 26 are all arranged at a left end of the heat exchanger plate 23, with the second heat pipes 27 arranged in a right side of the heat exchanger plate 23. For example, in the battery heat radiation unit 22 located intermediately, the first heat pipes 26 are arranged in a central portion of the heat exchanger plate 23, with the second heat pipes 27 arranged at the right end and a left end of the heat exchanger plate 23. For example, in the battery heat radiation unit 22 located at a rightmost position, the first heat pipes 26 are all arranged at a right end of the heat exchanger plate 23, with the second heat pipes 27 arranged in a left side of the heat exchanger plate 23.

A cooling effect of the battery heat radiation system 11 in the present embodiment will be described.

When charging or the like is rapidly performed on a large number of the battery cells 32 using a charging apparatus, the battery cells 32 generate heat. Part of the heat generated by the battery cells 32 (first battery modules 24 and second battery modules 25) is transmitted to the heat exchanger plate 23, from which the heat is transmitted to the first heat pipes 26, or during the transmission, the heat is transmitted to the first heat pipes 26 via the second heat pipes 27. Alternatively, part of the heat generated by the battery cells 32 is transmitted directly to the first heat pipes 26. Due to the high heat-conducting performance of the heat pipes, the heat transmitted to the first heat pipes 26 is efficiently transmitted from the first end 26A to the second end 26B, where the heat radiation portion 28 is located. On the other hand, the air blowing portion 16 blows air to the duct portion 14, and the cooling air draws heat from the heat radiation portion 28, exposed into the duct portion 14. Thus, the heat radiation portion 28 is cooled.

In the present embodiment, since the heat radiation portions 28 are misaligned with one another in the lateral direction as described above, each of the heat radiation portions 28 is supplied with cooling air at a low temperature that is not warmed by the other heat radiation portions 28. In this manner, each of the heat radiation portions 28 is efficiently cooled, and heat generated by the battery modules (each battery cell 32) is efficiently released to the external environment.

According to the present embodiment, the battery heat radiation system 11 comprises the plurality of battery modules, the plurality of heat pipes thermally connected at the first ends 26A to one surface of each of the battery modules and protruding from the battery module at the second ends 26B, the plurality of metal heat exchanger plates 23 each thermally connected to one surface of the battery module, the plurality of heat radiation portions 28 provided at the second ends 26B of the heat pipes, and the air blowing portion 16 that blows air to the plurality of heat radiation portions 28. One heat radiation portion 28 of the plurality of heat radiation portions 28 is misaligned with the other heat radiation portions 28 of the plurality of heat radiation portions 28 as viewed from the air blowing portion 16 side.

This configuration allows the heat radiation portion 28 located on the outlet 17 side of the duct portion 14 to be prevented from being supplied with air warmed by the heat radiation portion 28 located on the inlet 15 side. Thus, cooling air at a low temperature can be supplied to each heat radiation portion. Furthermore, a situation can be prevented where the heat radiation portion 28 located on the inlet 15 side causes a pressure loss, precluding the heat radiation portion 28 located on the outlet 17 side from exhibiting sufficient cooling performance.

The arrangement of the first heat pipes 26, the second heat pipes 27, and the heat radiation portion 28 may be modified as depicted in FIG. 8. FIG. 8 depicts, from the direction in which the air blowing portion 16 is located, the first battery module 24 (second battery module 25), first heat pipes 26, the second heat pipes 27, and heat radiation portion 28 of the battery heat radiation unit 22.

As in the modification depicted in the FIG. 8, one heat radiation portion 28 of the plurality of heat radiation portions 28 may be misaligned with the other heat radiation portions 28 of the plurality of heat radiation portion 28, in a direction D2 in which the first heat pipes 26 protrude from the first battery module 24, as viewed from the air blowing portion 16 side. Moreover, one heat radiation portion 28 of the plurality of heat radiation portions 28 may be misaligned with the other heat radiation portions 28 of the plurality of heat radiation portion 28 in the direction D1 crossing (orthogonal to) the direction, in which the first heat pipes 26 protrude from the first battery module 24 and extending along the heat exchanger plate 23, as viewed from the air blowing portion 16 side.

Third Embodiment

Figure 9:
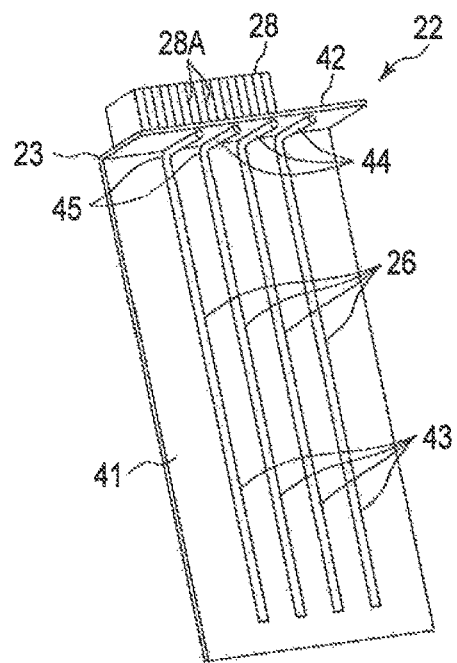
FIG. 9 is a perspective view depicting a heat exchanger plate, first heat pipes, and a heat radiation portion in a battery heat radiation unit in a third embodiment.
Figure 10:
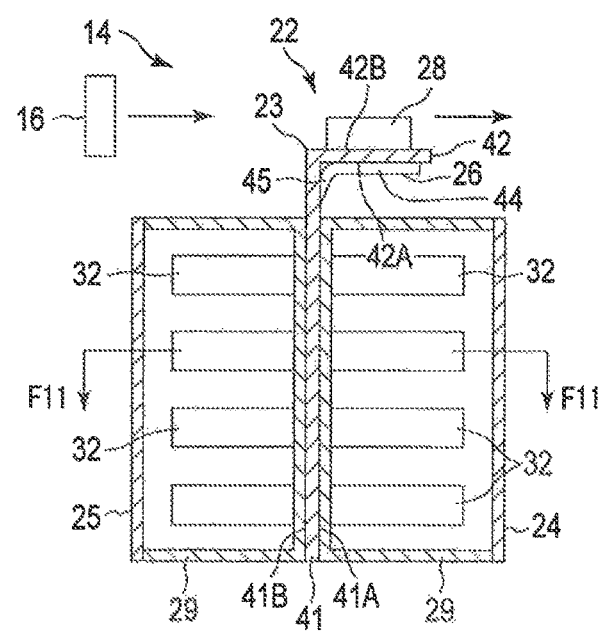
FIG. 10 is a sectional view of the heat exchanger plate, the first heat pipes, the heat radiation portion, a first battery module, and a second battery module in the battery heat radiation unit depicted in FIG. 9, the view being taken along a vertical direction.

With reference to FIGS. 9 to 11, a third embodiment of a battery heat radiation system will be described below. The battery heat radiation system 11 in the present embodiment is the same as the battery heat radiation system 11 in the first embodiment except that the shape of the heat exchanger plate 23 and the first heat pipes 26 are different, the second heat pipes 27 are omitted, and an arrangement of the heat radiation portion 28 is different. Thus, the parts that differ will mainly be described below, and the parts that are the same are denoted by the same reference numerals and will not be described.

As depicted in FIG. 9 and FIG. 10, the heat exchanger plate 23 is formed of a highly-heat-conductive metal such as copper or aluminum and shaped like the letter "L". The heat exchanger plate 23 comprises a first portion thermally connected to one surface of the first battery module 24 and one surface of the second battery module 25, and a second portion 42 extending in a direction crossing the first portion 41 from a position (an end of the first portion 41) of the first portion that protrudes from the first battery module 24 and the second battery module 25. As depicted in FIG. 11, the first portion 41 has recessed portions 31 in which first connection portions 43 of the respective first heat pipes 26 are housed.

As depicted in FIG. 9, each of the first heat pipes 26 comprises the first connection portion 43 fixed to one surface of the first battery module 24, a second connection portion 44 fixed to one surface 42A of the second portion 42, and a coupling portion 45 that couples the first connection portion 43 and the second connection portion 44 together. The first connection portion 43 extends along the first portion 41 of the heat exchanger plate 23 and is housed in the corresponding recessed portion 31.

As depicted in FIG. 11, the first connection portion 43 is shaped to have an elliptic section that is flat in a thickness direction of the heat exchanger plate 23 so as to increase the area of contact between the first battery module 24 and the heat exchanger plate 23. That is, in other words, the first connection portion 43 has a flat surface extending along one surface of the first battery module 24. A surface defined by the first connection portions 43 is equal in height to the surface of the heat exchanger plate 23 located around each of the first connection portions 43. The first connection portions 43 are fixed and thermally connected to the first portion 41 by means of, for example, soldering, caulking, or brazing. Thus, a heat receiving surface with no recesses or protrusions is formed on the opposite surfaces of the first portion 41 of the heat exchanger plate 23.

As depicted in FIG. 10, the first battery module 24 is fixed to a first surface 41A of the first portion 41 of the heat exchanger plate 23 and thermally connected to the first portion 41. The second battery module 25 is fixed to a second surface 41B of the first portion 41 of the heat exchanger plate 23 and thermally connected to the first portion 41.

The second connection portion 44 extends along the second portion 42 of the heat exchanger plate 23. The second connection portion 44 is fixed and thermally connected to a first surface 42A of the second portion 42 by means of, for example, soldering, caulking, or brazing.

The heat radiation portion 28 is fixed to a second surface 42B of the second portion 42 that is opposite to the first surface 42A of the second portion 42. The heat radiation portion 28 comprises a plurality of fins 28A for heat radiation arranged at regular intervals.

As depicted in FIG. 11, the heat conducting sheet 33 having elasticity similar to the elasticity of rubber is interposed between the heat exchanger plate 23 and the first battery module 24. The heat conducting sheet 33 enhances adhesion between the heat exchanger plate 23 and the first battery module 24. Similarly, the heat conducting sheet 33 having elasticity similar to the elasticity of rubber is interposed between the heat exchanger plate 23 and the second battery module 25. The heat conducting sheet 33 enhances adhesion between the heat exchanger plate 23 and the second battery module 25. The heat conducting sheets 33 are formed of, for example, a synthetic resin material. Instead of the heat conducting sheet 33, heat-conductive grease may be used to enhance the adhesion.

A cooling effect of the battery heat radiation system 11 in the present embodiment will be described.

When charging or the like is rapidly performed on a large number of the battery cells 32 using a charging apparatus, the battery cells 32 generate heat. Part of the heat generated by the battery cells 32 (first battery modules 24 and second battery modules 25) is transmitted to the heat exchanger plate 23, from which the heat is transmitted to the first heat pipes 26. Alternatively, part of the heat generated by the battery cells 32 is transmitted directly to the first heat pipes 26. Due to the high heat-conducting performance of the heat pipes, the heat transmitted to the first heat pipes 26 is efficiently transmitted from the first connection portions 43 to the second connection portions 44, where the heat radiation portion 28 is located. The heat transported to the second connection portions 44 is transmitted to the heat radiation portion 28 via the second portion 42 of the heat exchanger plate 23. Alternatively, part of the heat generated by the battery cells 32 travels through the heat exchanger plate 23 from the first portion 41 to the second portion 42. The heat is thus transmitted to the heat radiation portion 28.

On the other hand, as depicted by arrows in FIG. 10, the air blowing portion 16 blows air to the duct portion 14, and the cooling air draws heat from the heat radiation portion 28, exposed into the duct portion 14. Thus, the heat radiation portion 28 is cooled. In this manner, the heat generated by the battery modules (each battery cell 32) is released into the atmosphere.

According to the third embodiment, the battery heat radiation system 11 comprises the plurality of battery modules, the plurality of metal heat exchanger plates 23 each comprising the first portion 41 thermally connected to one surface of each of the battery modules and the second portion 42 extending in the direction crossing the first portion 41 from the position of the first portion 41 that protrudes from the battery module, the plurality of heat pipes each comprising the first connection portion 43 thermally connected to one surface of the battery module and extending along the first portion 41, the second connection portion 44 fixed to the first surface 42A of the second portion 42 and extending along the second portion 42, and the coupling portion 45 coupling the first connection portion 43 and the second connection portion 44 together, the heat radiation portion 28 provided on the second surface 42B opposite to the first surface 42A, and the air blowing portion 16 that blows air to the heat radiation portion 28.

In this configuration, the heat pipes are fixed to the first portion 41 and the second portion 42 of the heat exchanger plate 23, allowing the heat exchanger plate 23 to reinforce the heat pipes (first heat pipes 26). Thus, for example, if the battery heat radiation system 11 is used for a moving vehicle such as an electric car, the heat pipes can be prevented from being subjected to the load of the heat radiation portion 28 and thus from being damaged.

The first connection portion 43 has a flat surface extending along the one surface of the battery module. The first portion 41 has the recessed portions 31 in which the first connection portions 43 are housed. In this configuration, the heat pipes are inhibited from protruding from the surface of the heat exchanger plate 23, providing a large contact area between the battery module and the heat pipes and between the battery module and the heat exchanger plate 23.

Figure 12:
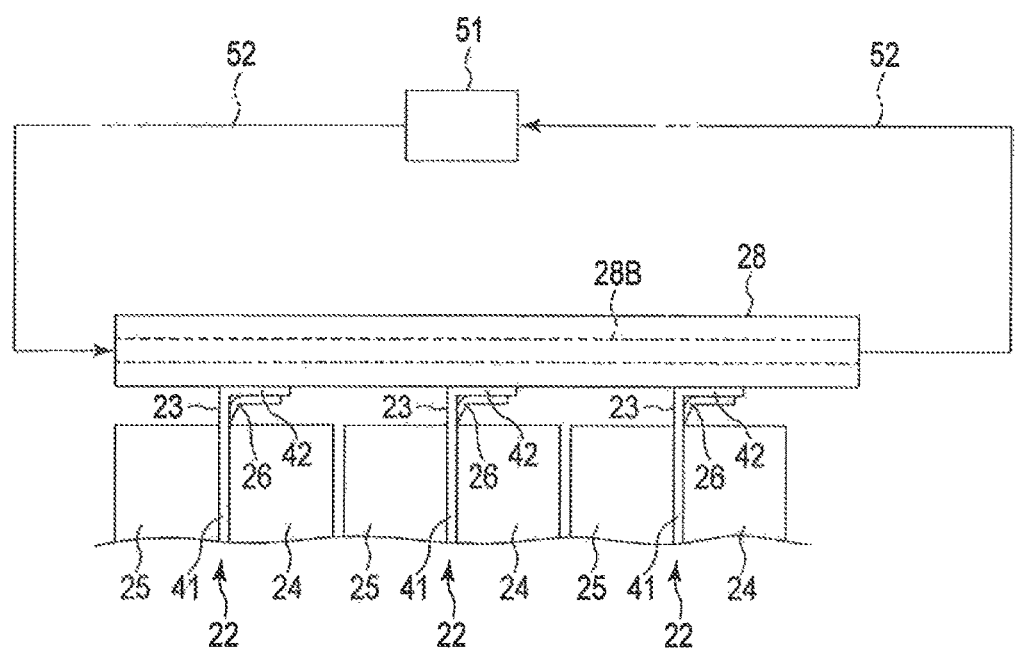
FIG. 12 is a schematic side view diagram depicting a first modification of the battery heat radiation unit in the third embodiment depicted in FIG. 9.

Instead of comprising the plurality of fins 28A for heat radiation as described above, the heat radiation portion 28 may be modified as depicted in FIG. 12. That is, in a first modification, the heat radiation portion 28 is provided to span the second portions 42 of the plurality of heat exchanger plates 23. The heat radiation portion 28 comprises a water-cooling jacket having a channel 28B inside. In the first modification, a cooling liquid fed from a supply source 51 is circulated through a circulation path 52 and an inner channel 28B in the water-cooling jacket to allow heat to be continuously drawn from the first battery module 24 and the second battery module 25 (heat exchanger plate 23).

In the first modification, the heat radiation portion 28 spans the plurality of second portions 42, and the cooling liquid is passed through the heat radiation portion 28. This configuration allows one heat radiation portion 28 to cool the plurality of battery modules, the first battery module 24 and the second battery module 25 (heat exchanger plate 23), enabling reduction of the number of the heat radiation portions 28 and simplification of the structure.

Figure 13:
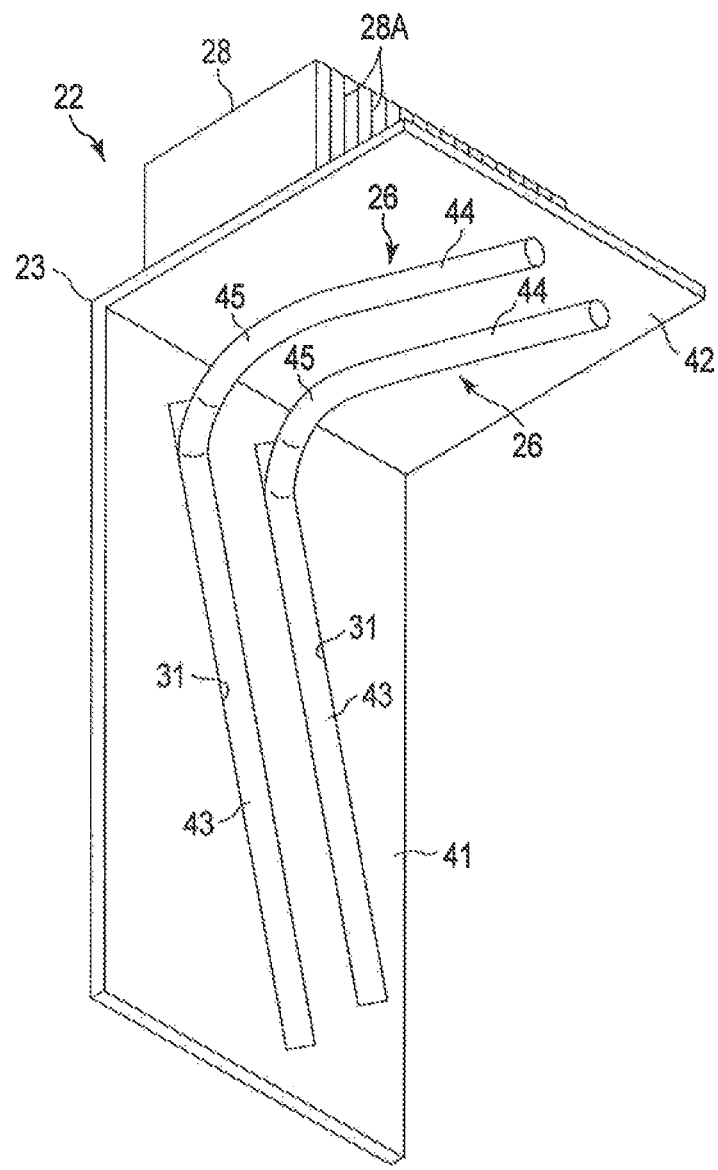
FIG. 13 is a sectional view depicting a second modification of the battery heat radiation unit in the third embodiment.
Figure 14:
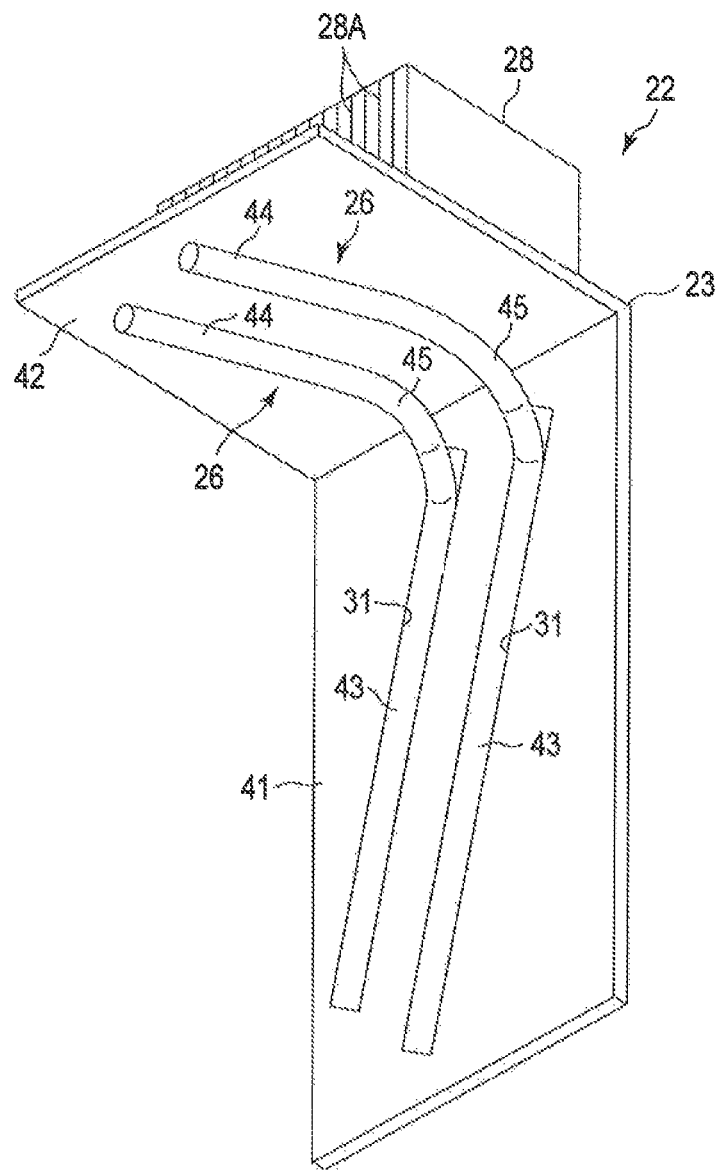
FIG. 14 is a sectional view depicting another example of the second modification of the battery heat radiation unit in the third embodiment.

The first heat pipes 26 can be modified as in a second modification depicted in FIG. 13 and FIG. 14. In the second modification, the first connection portions 43 of the first heat pipes 26 are obliquely arranged along a diagonal direction of the first portion 41 of the heat exchanger plate 23. Similarly, the second connection portions 44 of the first heat pipes 26 are obliquely arranged along a diagonal direction of the second portion 42 of the heat exchanger plate 23. The first portion 41 of the heat exchanger plate 23 has the recessed portions 31 in which the first connection portions 43 are housed. Each of the first connection portions 43 has a flat shape in the thickness direction of the heat exchanger plate 23 (first portion 41) so as to increase the area of contact between the first connection portion 43 and the first battery module 24. The arrangement of the first heat pipes 26 depicted in FIG. 13 and the arrangement of the first heat pipes 26 depicted in FIG. 14 are laterally symmetric.

In the second modification, the first connection portions 43 extend along a direction along a diagonal line of the first portion 41, and the second connection portions 44 extend along a diagonal line of the second portion 42. This configuration enables a reduction in the number of the first heat pipes 26, allowing the structure to be simplified. Furthermore, compared to the third embodiment depicted in FIG. 9, this configuration allows each of the first heat pipes 26 to be gently curved between the first connection portion 43 and the second connection portion 44 (so as to increase the radius of curvature of the coupling portion 45). This inhibits migration of the working fluid through the first heat pipes 26 from being hindered, preventing a reduction in a heat transport efficiency of the heat pipes.

Figure 16:
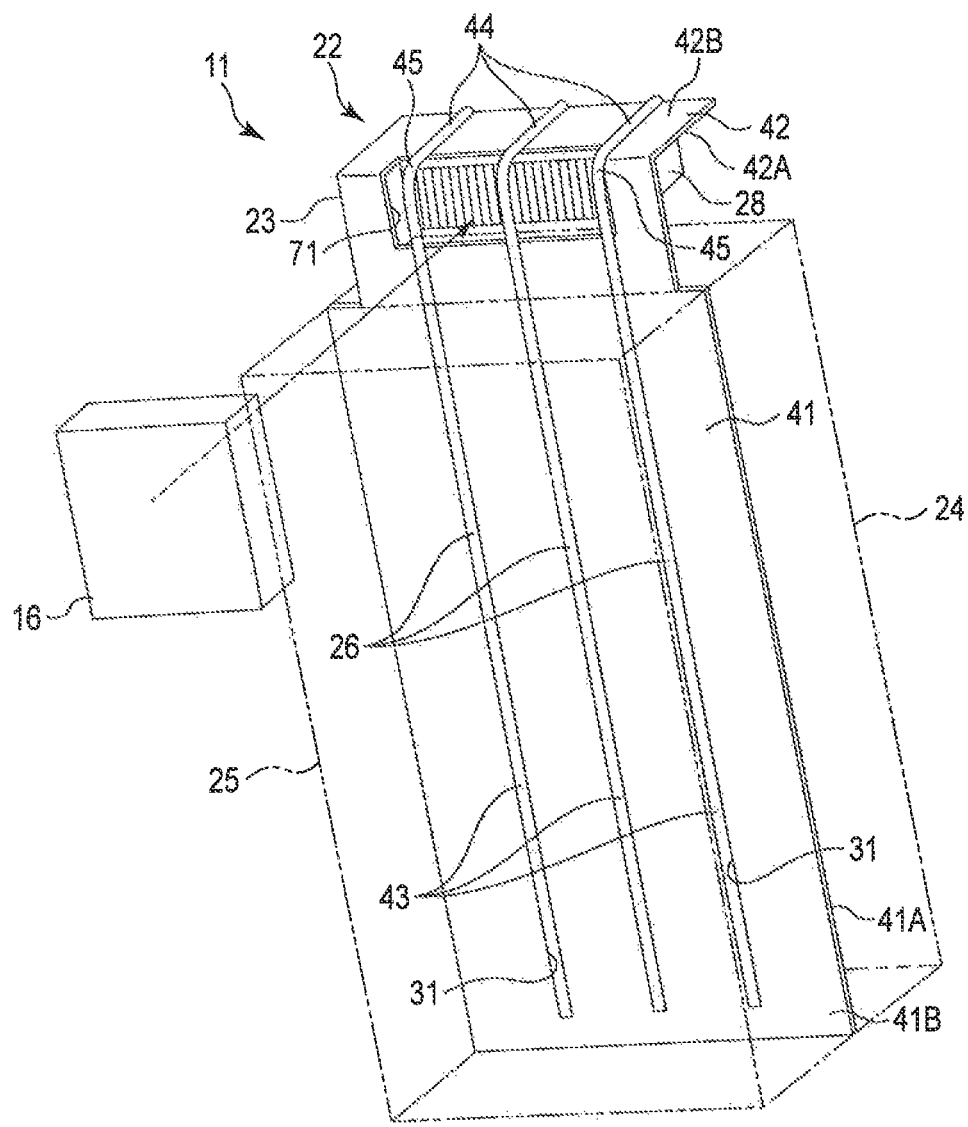
FIG. 16 is a perspective view depicting a third modification of the battery heat radiation unit in the third embodiment.

The first heat pipes 26, the heat exchanger plate 23, and the heat radiation portion 28 may be modified as in a third modification depicted in FIG. 16. In the third modification, the first connection portions 43 of the first heat pipes 26 are connected to the second surface 41B of the first portion 41 of the heat exchanger plate 23. The second connection portions 44 of the first heat pipes 26 are arranged on the first surface 42B of the second portion 42. The first portion 41 (second surface 41B) of the heat exchanger plate 23 has the recessed portions 31 in which the first connection portions 43 are housed. Each of the first connection portions 43 has a flat shape in the thickness direction of the heat exchanger plate 23 (first portion 41) so as to increase the area of contact between the first connection portion 43 and the second battery module 25.

The heat exchanger plate 23 has a square opening 71 at a position where the heat exchanger plate 23 bridges the first portion 41 and the second portion 42 (a corner corresponding to a boundary between the first portion 41 and the second portion 42). The coupling portion 45 is positioned inside the opening 71, and thus, the first heat pipes 26 are gently curved between the first connection portion 43 and the second connection portion 44 (so as to increase the radius of curvature of the coupling portion 45).

The heat radiation portion 28 is provided on the second surface 42A of the second portion 42 of the heat exchanger plate 23. The structure of the heat radiation portion 28 is similar to the structure of the heat radiation portion 28 in the third embodiment. The opening 71 forms a passage that allows cooling air to pass through the heat radiation portion 28.

In the third modification, the first heat pipes 26 can be gently curved between the first connection portion 43 and the second connection portion 44 (so as to increase the radius of curvature of the coupling portion 45). This inhibits migration of the working fluid through the first heat pipes 26 from being hindered, preventing a reduction in the heat transport efficiency of the heat pipes. Furthermore, the heat radiation portion 28 is arranged at the position between the first battery module 24 and the second portion 42 of the heat exchanger plate 23 such that the position between the first battery module 24 and the second portion 42 serves as an air blowing passage. This allows a compact configuration of the battery heat radiation unit 22 and the battery heat radiation system 11 with the battery heat radiation units 22 mounted therein. Additionally, the heat exchanger plate 23 has the opening 71 at the position where the opening 71 overlaps the heat radiation portion 28 as seen from the air blowing portion 16 side. Thus, even this arrangement allows the heat radiation portion 28 to efficiently radiate heat.

Fourth Embodiment

With reference to FIG. 15, a fourth embodiment of the battery heat radiation system 11 will be described below. The battery heat radiation system 11 in the present embodiment is the same as the battery heat radiation system 11 in the first embodiment except for the arrangement of a seal member 61 that partitions a housing space 21A inside the case 21 of the secondary battery pack 12 from the inside of the duct portion 14. Thus, mainly different parts will be described below, and the same parts are denoted by the same reference numerals and will not be described.

A battery heat radiation system 11 comprises a secondary battery pack 12 and a cooling unit 13 mounted at a top of the secondary battery pack 12.

The cooling unit 13 comprises a plurality of duct portions 14 attached to an upper portion of the secondary battery pack 12, a plurality of air blowing portions 16 provided at inlets 15 of the duct portions 14, and a partition wall 18 provided between outlets 17 of the duct portions 14. A plurality of the heat radiation portions 28 are housed inside the duct portion 14 such that the heat radiation portions 28 are spaced at intervals. The air blowing portion 16 allows outside air to be blown from the inlet 15 toward the outlet 17 of the duct portion 14.

The secondary battery pack 12 comprises the case 21 forming a shell, the plurality of battery heat radiation units 22 housed in the case 21, and the seal member 61 that partitions the housing space inside the case 21 from the inside of the duct portion 14.

The battery heat radiation unit 22 comprises the heat exchanger plate 23, the first battery module 24 fixed and thermally connected to the first surface 23A of the heat exchanger plate 23, the second battery module 25 fixed and thermally connected to the second surface 23B of the heat exchanger plate 23, the first heat pipes 26 thermally connected to the first battery module 24 and the second battery module 25 via the heat exchanger plate 23, the second heat pipes 27 fixed to the heat exchanger plate 23, and the heat radiation portion 28 provided at the second ends 26B of the first heat pipes 26. In FIG. 15, the first battery module 24 is not illustrated, but the heat exchanger plate 23 and the like are depicted.

The case 21 has a square opening 62 through which the first heat pipes 26 protrude to the duct portion 14 side. The seal member 61 is formed to have substantially the same shape as that of the opening 62 and is installed in the opening 62 so as to block the opening 62 in a gas- and water-tight manner. The seal member 61 has a plurality of circular through-holes through which the first heat pipes 26 are passed. The seal member 61 blocks the opening 62 to allow an internal space in the case 21 to be closed.

A cooling effect of the battery heat radiation system 11 in the present embodiment will be described.

When charging or the like is rapidly performed on a large number of the battery cells 32 using a charging apparatus, the battery cells 32 generate heat. Part of the heat generated by the battery cells 32 is transmitted to the heat exchanger plate 23, from which the heat is transmitted to the first heat pipes 26, or during the transmission, the heat is transmitted to the first heat pipes 26 via the second heat pipes 27. Alternatively, part of the heat generated by the battery cells 32 is transmitted directly to the first heat pipes 26. Due to the high heat-conducting performance of the heat pipes, the heat transmitted to the first heat pipes 26 is efficiently transmitted from the first end 26A to the second end 26B, where the heat radiation portion 28 is located. Furthermore, the air blowing portion 16 blows air to the duct portion 14, and the cooling air draws heat from the heat radiation portion 28, exposed into the duct portion 14. Thus, the heat radiation portion 28 is cooled.

On the other hand, in the present embodiment, the seal member 61 partitions the internal space in the duct portion 14 from the internal space (housing space 21A) in the case 21 of the secondary battery pack 12. Thus, the cooling air from the air blowing portion 16 is inhibited from entering the inside of the case 21, preventing the inside of the case 21 from being dusty and humid.

The heat radiation portion 28 and the air blowing portion 16 act to release the heat generated by the battery modules (each battery cell 32) into the atmosphere.

According to the fourth embodiment, the battery heat radiation system 11 comprises the duct portion 14 configured to guide air from the air blowing portion 16 to the heat radiation portion 28, the case 21 that covers the plurality of battery modules and the heat exchanger plate 23, and the seal member 61 that partitions the internal space in the duct portion 14 from the internal space in the case 21. That is, exposing the battery modules and wiring therefor directly to the outside air is not preferable in terms of safety because this exposes the battery modules and the wiring therefor to humidity, salt, dust, and the like. This configuration prevents the space inside the case 21 with the plurality of battery modules housed therein from being dusty or humid, minimizing a possibility that the battery modules will be degraded. Consequently, durability and reliability of the battery modules can be enhanced.

The above-described battery heat radiation system 11 has been mostly described in connection with the example where the battery heat radiation system 11 is applied to the secondary battery pack mounted in an electric car (in-vehicle secondary battery pack). However, the battery heat radiation system 11 can of course be utilized as a secondary battery pack for means of transportation other than electric cars, such as automobiles, motorcycles, railroad vehicles, airplanes, linear motor cars, and ships. Moreover, the above-described battery heat radiation system is not only mounted in the moving vehicles as described above but can also be used for applications where the battery heat radiation system is fixedly installed on the ground. Furthermore, the first embodiment (including the modification thereof), the second embodiment (including the modification thereof), the third embodiment (including the first to third modifications thereof), and the fourth embodiment may be implemented by being combined together. For combination of the third embodiment and the fourth embodiment, a through-slot may be formed in the seal member 61 so as to allow the first portion 41 of the heat exchanger plate 23 to pass through the through-slot. For combination of the second embodiment and the third embodiment, in the direction crossing (orthogonal to) the direction in which the first connection portions 43 of the first heat pipes 26 protrude from the first battery module 24 and extending along the first portion 41 of the heat exchanger plate 23, the heat radiation portion 28 may be misaligned (on the second portion 42 of the heat exchanger plate 23) with the other heat radiation portions 28 of the plurality of heat radiation portions 28.

Fifth Embodiment

With reference to FIGS. 17 to 23, a fifth embodiment of the battery heat radiation system 11 will be described below. The battery heat radiation system 11 in the present embodiment is the same as the battery heat radiation system 11 in the third embodiment except that the heat exchanger plate 23 is differently shaped so as to separate the first portion 41 from the second portion 42, that a first bracket is provided to fix the first battery module 24 to the heat exchanger plate 23, and that the second portion 42 is divided into two pieces in the thickness direction thereof, for example. Thus, mainly parts of the present embodiment that are different from the corresponding parts of the third embodiment will be described below, and the same parts are denoted by the same reference numerals and will not be described.

Like the secondary battery pack 12 depicted in FIG. 1 and FIG. 2, the secondary battery pack 12 comprises the case 21 forming a shell and the plurality of battery heat radiation units 22 housed in the case 21.

As depicted in FIGS. 17 to 20 and FIG. 22, each of the battery heat radiation units 22 comprises the heat exchanger plate 23, the first battery module 24 fixed and thermally connected to the first surface 23A of the heat exchanger plate 23, the first heat pipes 26 connected directly to the first battery module 24 or thermally connected to the first battery module 24 via the heat exchanger plate 23, the heat radiation portion 28 fixed to a part of the heat exchanger plate 23, a first bracket 81 that allows the first battery module 24 to be fixed to the heat exchanger plate 23, a first holding member 82 attached to the first bracket 81 to prevent the first battery module 24 from falling down from the inside of the first bracket 81, a pair of fixing members 83 that fix the first bracket 81 to the second portion 42 of the heat exchanger plate 23, and a packing 84 fixed to the second portion 42 of the heat exchanger plate 23. The structures of the first battery module 24 and the heat radiation portion 28 are similar to the structures of the first battery module 24 and the heat radiation portion 28 in the first embodiment.

Figure 22:
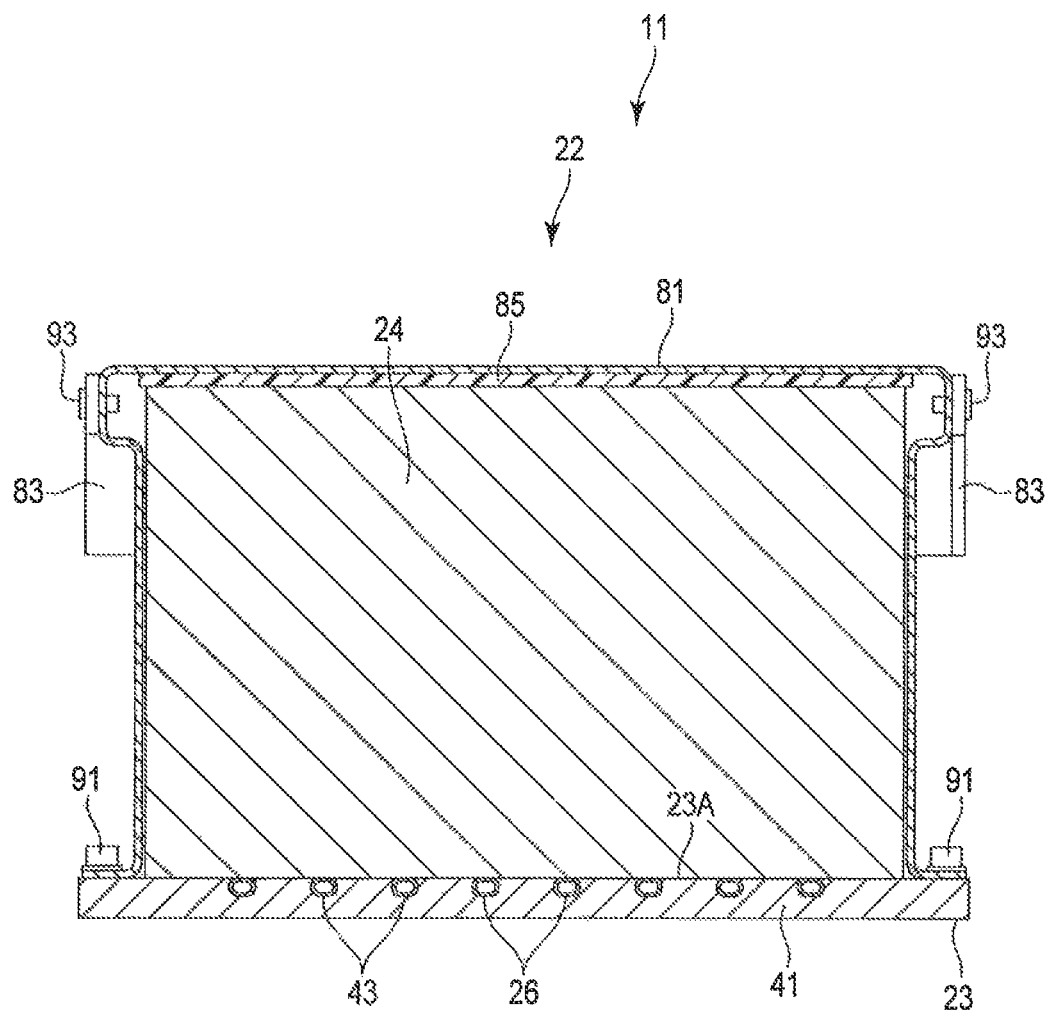
FIG. 22 is a sectional view of the battery heat radiation unit depicted in FIG. 17, the view being taken along the vertical direction.

The first bracket 81 is formed by, for example, bending a metal plate material such that the metal plate material has, for example, a generally "U"-shaped sectional shape (see FIG. 22). The first bracket 81 comprises first ends 81A located on the second portion side of the heat exchanger plate 23 and second ends 81B positioned opposite to the first ends 81A. As depicted in FIG. 22, a sheet member 85 exhibiting elasticity similar to the elasticity of rubber is stuck to an inner surface of the first bracket 81. An elastic force of the sheet member 85 allows the first battery module 24 to be firmly pressed against the heat exchanger plate 23 when the first bracket 81 is fixed.

Figure 17:
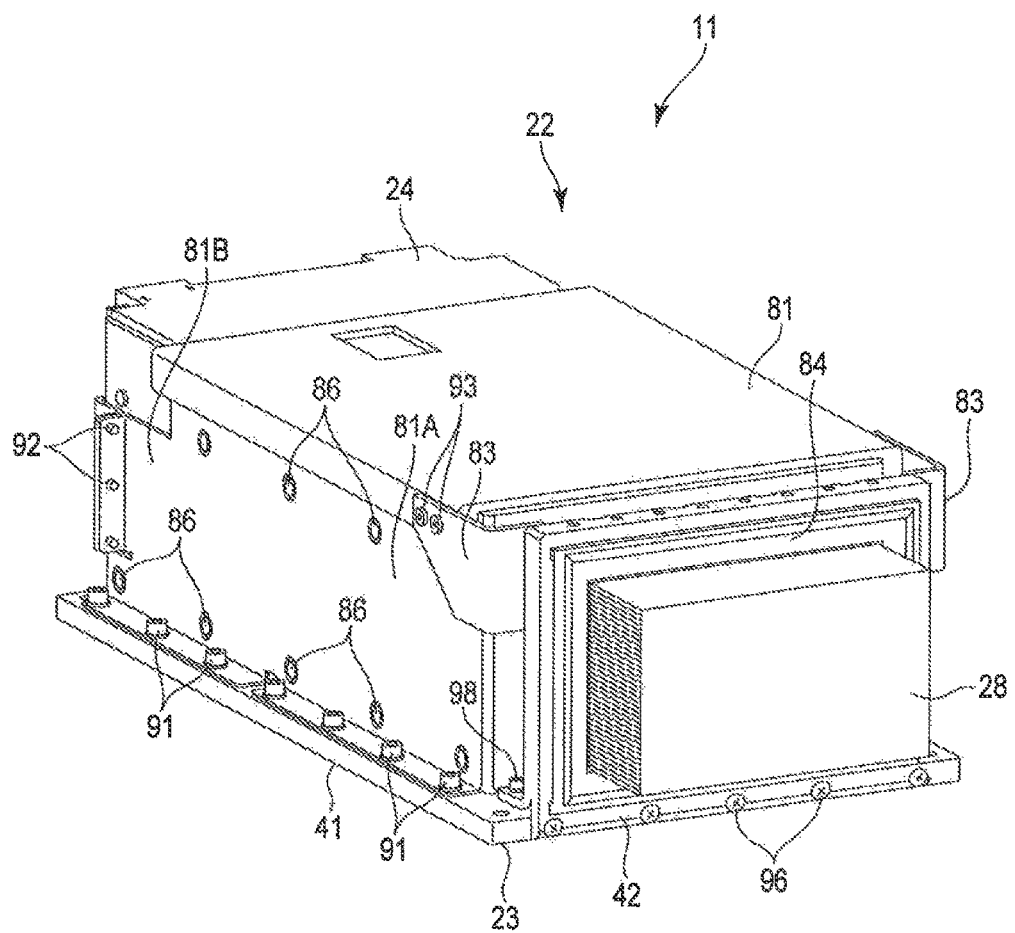
FIG. 17 is a perspective view depicting the structure of a battery heat radiation unit in a battery heat radiation system in a fifth embodiment.
Figure 18:
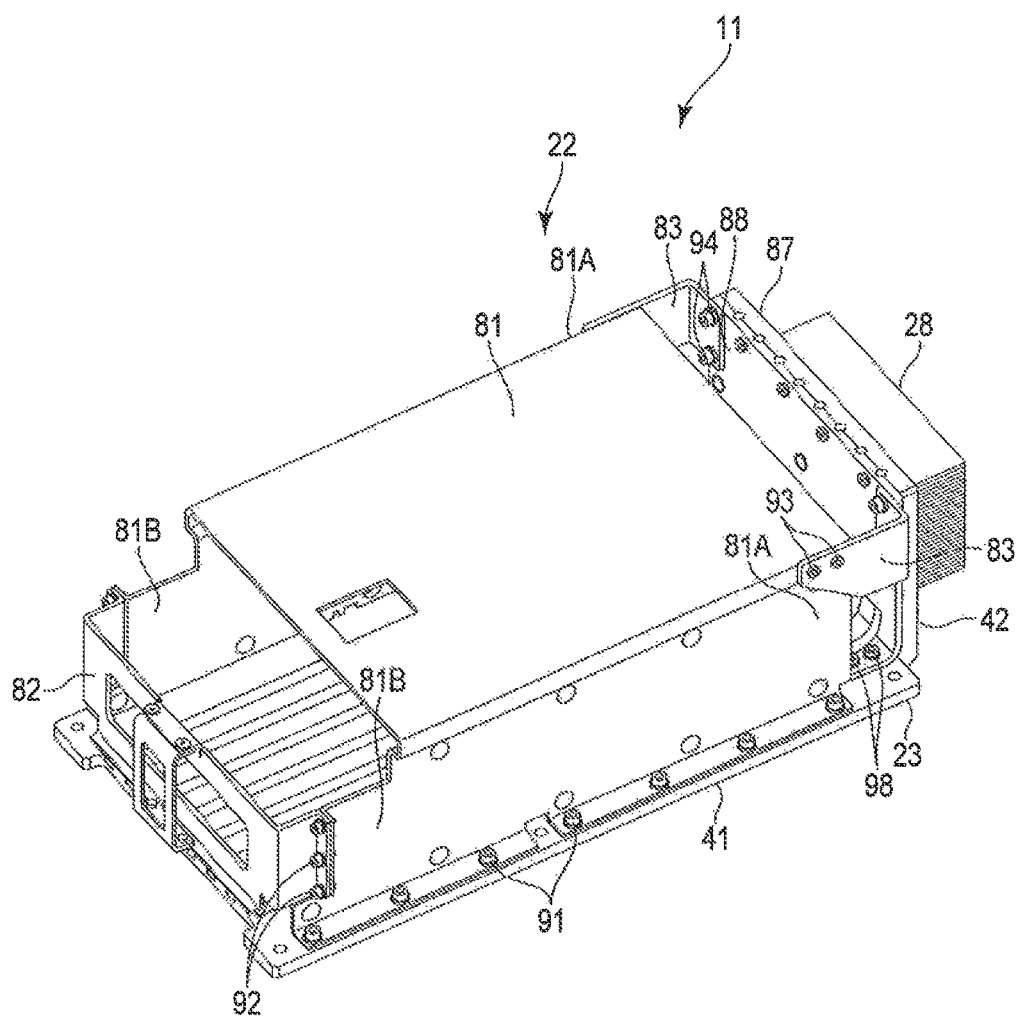
FIG. 18 is a perspective view depicting the battery heat radiation unit depicted in FIG. 17.

As depicted in FIG. 17 to 19, the first bracket 81 is fixed to the first portion 41 of the heat exchanger plate 23, for example, with first screws 91. The first bracket 81 and the first battery module 24 are fixed to each other with a plurality of fixing screws 86.

As depicted in FIG. 18, the first holding member 82 is formed by folding a metal plate material into a general "U" shape. The first holding member 82 can be fixed to the first bracket 81 so as to connect the second ends 81B of the first bracket 81 together. The first holding member 82 fixed to the second ends 81B allows the first battery module 24 to be prevented from falling down from the first bracket 81. The first holding member 82 is fixed to the first bracket 81, for example, with second screws 92.

Figure 21:
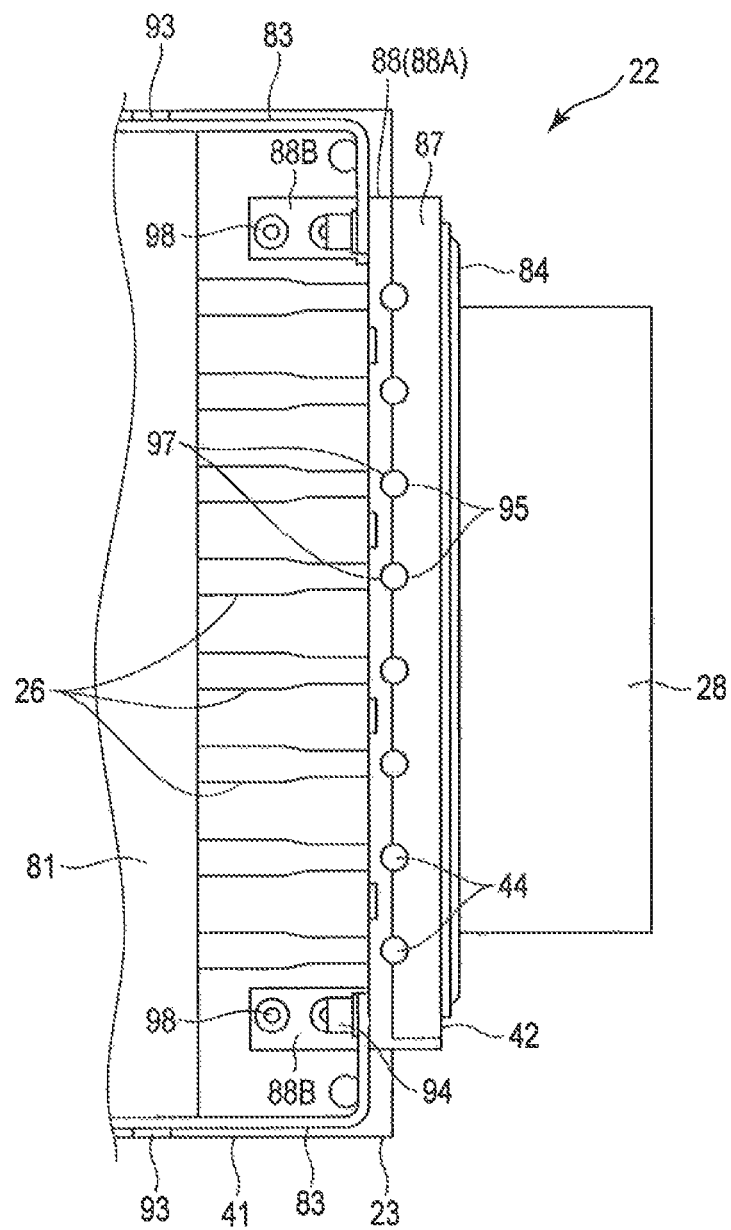
FIG. 21 is an enlarged top view depicting the heat exchanger plate and the first heat pipes depicted in FIG. 20.

As depicted in FIG. 18 and FIG. 21, the fixing members 83 are provided in a pair and fixed to the first ends 81A of the first bracket 81, for example, with third screws 93. Similarly, the fixing members 83 are also fixed to a second member 88 of the second portion 42 of the heat exchanger plate 23, for example, with fourth screws 94. Thus, the fixing members 83 allow the first ends 81A of the first bracket 81 to be firmly fixed to the second portion 42 of the heat exchanger plate 23.

As depicted in FIG. 17, the packing 84 is fixed to the first member 87 of the second portion 42 and shaped like a ring so as to surround a periphery of the heat radiation portion 28. In the present embodiment, an opening is formed in the duct portion 14 such that the heat radiation portion 28 is inserted into the opening. Consequently, the heat radiation portion 28 is arranged in the duct portion 14. The packing 84 closes a gap between the opening in the duct portion 14 and the heat radiation portion 28 to prevent dust and water droplets in the duct portion 14 from entering the first battery module 24 side and degrading the first battery module 24 (for example, causing an end of the first battery module 24 to rust).

Figure 20:
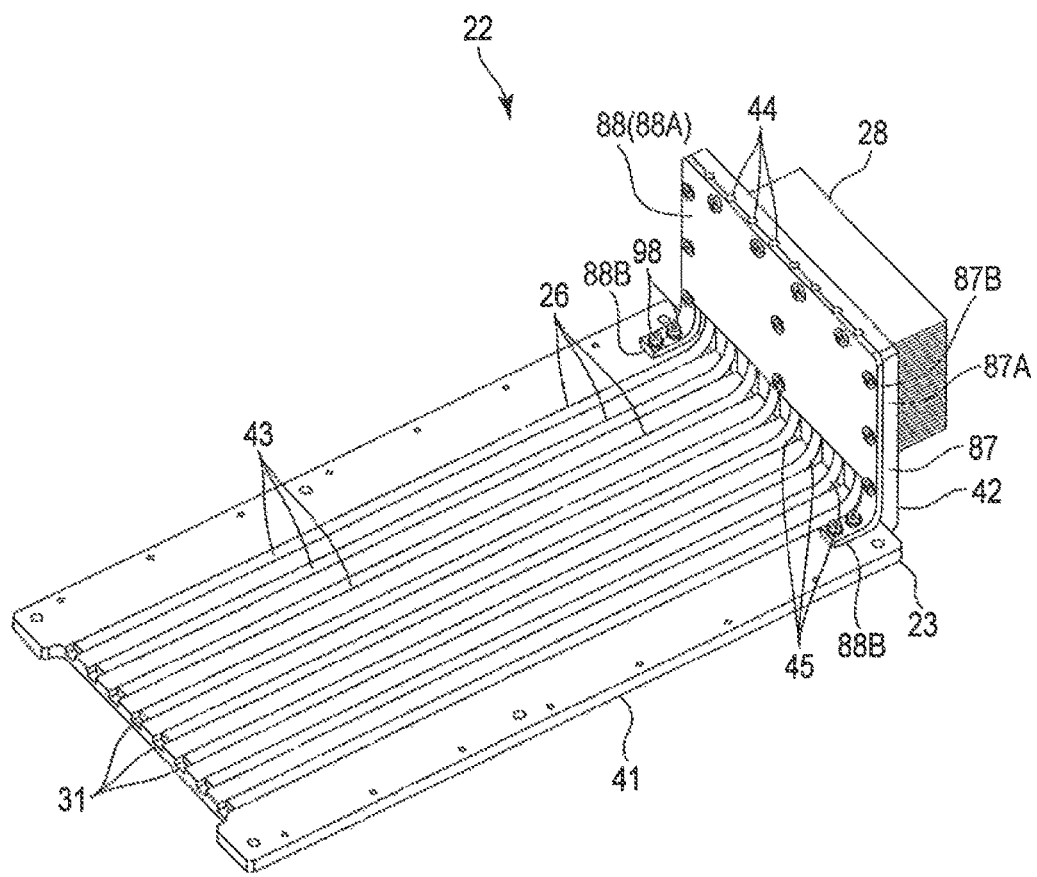
FIG. 20 is a perspective view depicting a heat exchanger plate and first heat pipes in the battery heat radiation unit depicted in FIG. 18.

As depicted in FIG. 20, each of the first heat pipes 26 comprises the first connection portion 43 fixed to one surface of the first battery module 24, the second connection portion 44 fixed to a second member of the second portion 42, and the coupling portion 45 that couples the first connection portion 43 and the second connection portion 44 together. That is, the shape of the first heat pipes 26 is similar to the shape of the first heat pipes 26 in the third embodiment. The first connection portions 43 extend along the first portion 41 of the heat exchanger plate 23 and are housed in the respective recessed portions 31 formed in the first portion 41. A surface defined by the first connection portions 43 is equal in height to the surface of the heat exchanger plate 23 located around each of the first connection portions 43.

The first connection portions 43 are fixed and thermally connected to the first portion 41 by means of, for example, soldering, caulking, or brazing. The second connection portions 44 extend in a direction crossing the first connection portions 43. As depicted in FIG. 21, the second connection portions 44 are fixed to the second portion 42 by being sandwiched between a first member 87 and a second member 88, described below, of the second portion 42.

As depicted in FIG. 20, the heat exchanger plate 23 is configured to generally have an "L" shape. However, in the present embodiment, the heat exchanger plate 23 is divided into the first portion 41 and the second portion 42 in view of manufacturability. The second portion 42 can be installed on and removed from the first portion 41. The second portion 42 extends from an end of the first portion 41 in a direction that crosses the first portion 41. The second portion 42 is fixed to the first portion 41, for example, with screws. The first portion 41 and the second portion 42 of the heat exchanger plate 23 are formed of a highly heat-conductive metal such as copper or aluminum. The shape of the first portion 41 of the heat exchanger plate 23 is substantially the same as the shape of the first portion 41 in the third embodiment.

As depicted in FIG. 20, the second portion 42 of the heat exchanger plate 23 comprises the first member 87, which is shaped like a plate and which has a first surface 87A to which the heat radiation portion 28 is fixed, and the second member 88, which is shaped like a plate and joined to a second surface 87B of the first member 87 that is opposite to the first surface 87A. The first member 87 and the second member 88 are integrally joined together with screws. As depicted in FIG. 21, the first member 87 has first recessed portions 95 each recessed like a semi-sphere so as to conform to an external shape of the second connection portion 44 of the corresponding first heat pipe 26. As depicted in FIG. 17, the first member 87 is fixed to an end surface of the first portion 41 with first set screws 96 extending in a first direction along the first portion 41 of the heat exchanger plate 23.

As depicted in FIG. 21, the second member 88 has second recessed portions 97 each recessed like a semi-sphere so as to conform to the external shape of the second connection portion 44 of the corresponding second heat pipe 26. As depicted in FIG. 20, the second member 88 comprises a main body portion 88A and an attachment portion 88B protruding from an end of the main body portion 88A to form a fixed portion fixed to the first portion 41. As depicted in FIG. 19, the attachment portion 88B extends in a direction crossing the main body portion 88A (the direction along the first portion 41). The second member 88 (attachment portion) is fixed to the first portion 41 in a second direction along a thickness direction of the first portion 41 using second set screws 98 extending in the second direction.

Therefore, in the present embodiment, the second portion 42 is fixed to the first portion 41 in the two different directions. Thus, the second portion 42 is inhibited from wobbling even when the battery heat radiation unit 22 is vibrated, and is firmly fixed to the first portion 41.

The first member 87 comes into abutting contact with the first connection portions 43 via the first recessed portions 95 and is thermally connected to the first connection portion 43. The second member 88 comes into abutting contact with the second connection portions 44 via the second recessed portions 97 and is thermally connected to the first connection portion 43.

Subsequently, effects of the battery heat radiation unit 22 in the present embodiment will be described. In the present embodiment, heat generated by the first battery module 24 is transmitted directly to the first connection portions 43 of the first heat pipes 26 or indirectly to the first connection portions 43 via the first portion 41 of the heat exchanger plate 23.

Heat from the first connection portions 43 of the first heat pipes 26 is transmitted to the second connection portions 44 by a heat transport effect of the working fluid. As depicted in FIG. 21, the heat transmitted to the second connection portion 44 is transmitted to the heat radiation portion 28 via the first member 87 of the second portion 42 of the heat exchanger plate 23. Similarly, the heat transmitted to the second connection portion 44 is also transmitted to the second member 88 of the second portion 42. The heat transmitted to the second member 88 is released directly to the atmosphere or transmitted to the heat radiation portion 28 via the first member 87. The heat transmitted to the heat radiation portion 28 is released to the air flowing through the duct portion 14.

According to the fifth embodiment, the battery heat radiation unit 22 comprises the battery module, the heat exchanger plate 23 comprising the first portion 41 thermally connected to one surface of the battery modules and the second portion 42 extending in the direction crossing the first portion 41 from the position of the first portion 41 that protrudes from the battery module, the heat pipes each comprising the first connection portion 43 fixed to the first portion 41 and thermally connected to one surface of the battery module and extending along the first portion 41, the second connection portion 44 thermally connected to the second portion 42, and the coupling portion 45 that couples the first connection portion 43 and the second connection portion 44 together, and the heat radiation portion 28 provided on the first surface of the second portion 42. The second portion 42 includes the first member 87 having the first recessed portions 95 that come into abutting contact with the second connection portions 44, with the heat radiation portion 28 fixed to the first member 87, and the second member 88 having the second recessed portions 97 that come into abutting contact with the second connection portions 44. The second connection portions 44 are sandwiched between the first member 87 and the second member 88.

This configuration brings the second connection portions 44 into abutting contact not only with the first member 87, located on the heat radiation portion 28 side, but also with the second member 88. This enables an increase in conduction efficiency of heat traveling from the second connection portion 44 toward the heat radiation portion 28 via the second portion 42. Furthermore, the heat radiation performance of the battery heat radiation unit 22 can be improved due to establishment not only of a transfer route through which heat travels from the second connection portion 44 toward the heat radiation portion 28 but also of a route through which heat is released directly into the atmosphere.

The battery heat radiation unit 22 comprises a bracket that fixes the battery module to the heat exchanger plate 23 and the fixing members 83 that fix the second portion 42 to the bracket. In this configuration, the second portion 42 is fixed to the bracket and can thus be firmly supported. This allows prevention of a situation where the second portion 42 to which the heat radiation portion 28 is attached wobbles due to the weight of the second portion 42, causing a load (bending load) to be imposed on the heat pipes connected to the second portion 42.

The second portion 42 can be installed on and removed from the first portion 41. This configuration allows the heat exchanger plate 23 to be more appropriately handled. That is, workability can be improved when the battery module is removed from the heat exchanger plate 23. Furthermore, when the first portion 41 and the second portion 42 are separate components, the first portion 41 and the second portion 42 can each be produced as a simply shaped component. This enables a reduction in manufacturing costs compared to a case where the integrated "L"-shaped heat exchanger plate 23 is produced.

The second portion 42 is fixed to the first portion 41 in the two different directions. This configuration enables a fixation structure for the second portion 42 to be made firmer. Thus, for example, when the battery heat radiation unit 22 is mounted in a means of transportation such as an automobile and vibrated, a possible situation can be prevented where the second portion 42 is vibrated to cause a load to be imposed on the heat pipes. Consequently, the heat pipes can be prevented from suffering a fatigue failure as a result of repeatedly imposed loads.

(Modification)

Figure 23:
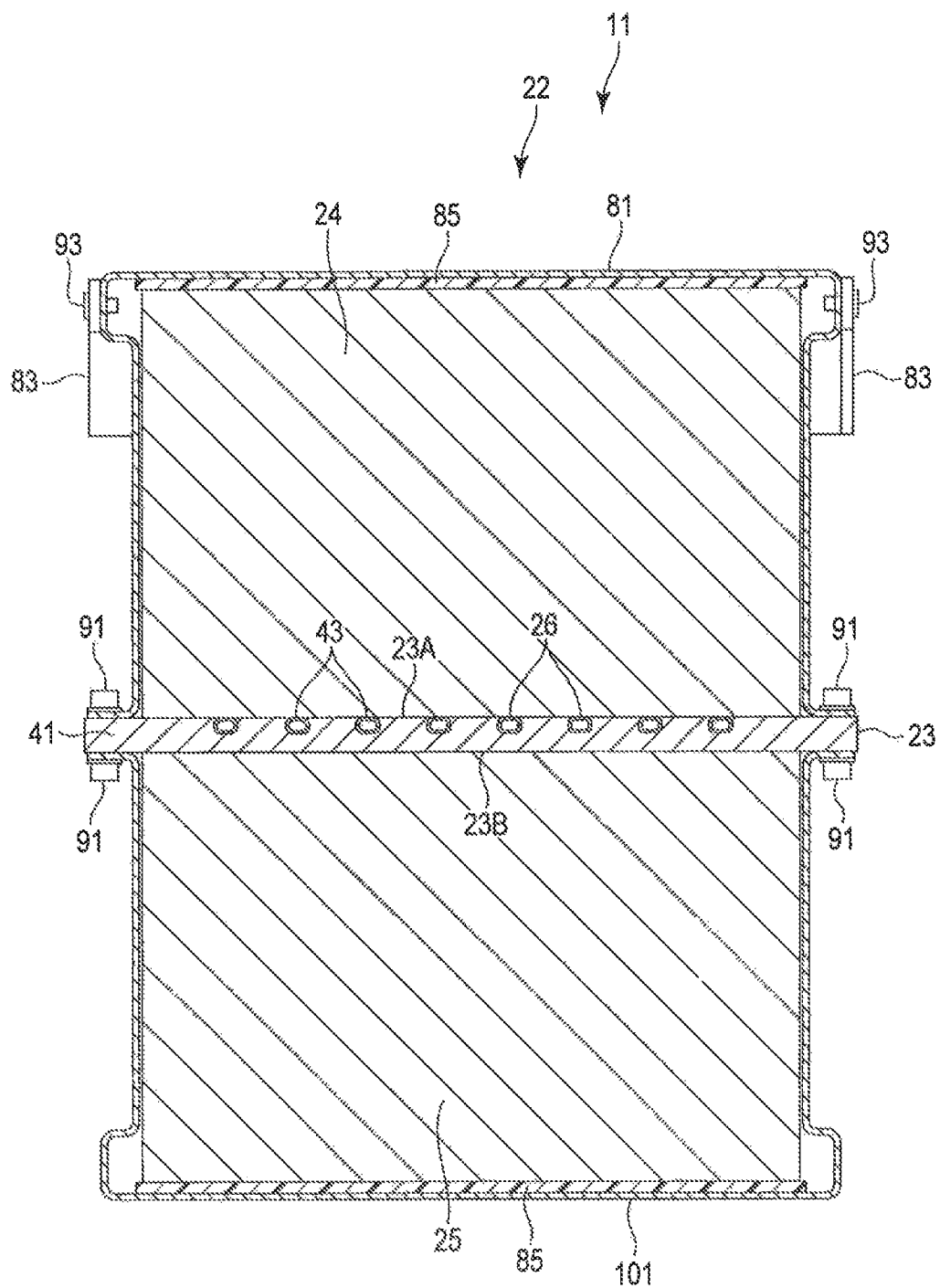
FIG. 23 is a sectional view depicting a modification of a battery heat radiation unit in a fifth embodiment.

Now, with reference to FIG. 23, a modification of the battery heat radiation system 11 in a fifth embodiment will be described. Mainly parts of the modification that are different from the corresponding parts of the fifth embodiment will be described below, and illustration or description of parts of the modification that are the same as the corresponding parts of the fifth embodiment is omitted. In the present embodiment, the battery modules are fixed to the opposite surfaces of the heat exchanger plate 23.

Like the secondary battery pack 12 depicted in FIG. 1 and FIG. 2, the secondary battery pack 12 comprises the case 21 forming a shell and the plurality of battery heat radiation units 22 housed in the case 21.

Each of the battery heat radiation units 22 comprises the heat exchanger plate 23, the first battery module 24 fixed and thermally connected to the first surface 23A of the heat exchanger plate 23, the second battery module 25 fixed and thermally connected to the second surface 23B of the heat exchanger plate 23, the first heat pipes 26 thermally connected directly to the first battery module 24 or indirectly to the first battery module 24 via the heat exchanger plate 23, the heat radiation portion 28 fixed to a part of the heat exchanger plate 23, the first bracket 81 that allows the first battery module 24 to be fixed to the heat exchanger plate 23, a second bracket 101 that allows the second battery module 25 to be fixed to the heat exchanger plate 23, the first holding member 82 attached to the first bracket 81 to prevent the first battery module 24 from falling down from the inside of the first bracket 81, a second holding member attached to the second bracket 101 to prevent the second battery module 24 from falling down from the inside of the second bracket 101, the fixing members 83 that fix the first bracket 81 to the second portion 42 of the heat exchanger plate 23, and the packing 84 fixed to the second portion 42 of the heat exchanger plate 23.

The structures of the first battery module 24, the second battery module 25, and the heat radiation portion 28 are similar to the structures of the first battery module 24, the second battery module 25, and the heat radiation portion 28 in the first embodiment. The structures of the heat exchanger plate 23, the first heat pipes 26, the fixing members 83, and the packing 84 are similar to the structures of the heat exchanger plate 23, the first heat pipes 26, the fixing members 83, and the packing 84 in the fifth embodiment.

The structure of the first bracket 81 is similar to the structure of the first bracket 81 in the fifth embodiment. The structure of the second bracket 101 is similar to the structure of the first bracket 81. The first bracket 81 and the second bracket 101 are each fixed to the heat exchanger plate with the third screws 93. The first bracket 81 and the first battery module 24 are fixed to each other with the plurality of fixing screws 86. Similarly, the second bracket 101 and the second battery module 25 are fixed to each other with the plurality of fixing screws 86.

The structure of the first holding member 82 is similar to the structure of the first holding member 82 in the fifth embodiment. The structure of the second holding member is similar to the structure of the first holding member 82.

According to the present modification, the battery modules are mounted on the opposite surfaces of the heat exchanger plate 23. This is useful particularly when the degree of integration of battery modules is to be improved. Furthermore, the present modification also allows the second portion 42 to be firmly supported. This allows the second portion 42 to be prevented from being wobbled, in turn preventing a load from being imposed on the heat pipes connected to the second portion 42.

The above-described battery heat radiation system 11 has been mostly described in connection with the example where the battery heat radiation system 11 is applied to the secondary battery pack mounted in an electric car (in-vehicle secondary battery pack). However, the battery heat radiation system 11 can of course be utilized as a secondary battery pack for means of transportation other than electric cars, such as automobiles, motorcycles, railroad vehicles, airplanes, linear motor cars, and ships. Moreover, the above-described battery heat radiation system 11 is not only mounted in the moving vehicles as described above but can also be used for applications where the battery heat radiation system 11 is fixedly installed on the ground. Furthermore, the first embodiment (including the modification thereof), the second embodiment (including the modification thereof), the third embodiment (including the first to third modifications thereof), the fourth embodiment, and the fifth embodiment (including the modification thereof) may be implemented by being combined together. For combination of the third embodiment and the fourth embodiment, a through-slot may be formed in the seal member 61 so as to allow the first portion 41 of the heat exchanger plate 23 to pass through the through-slot. For combination of the second embodiment and the third embodiment, in the direction crossing (orthogonal to) the direction in which the first connection portions 43 of the first heat pipes 26 protrude from the first battery module 24 and extending along the first portion 41 of the heat exchanger plate 23, the heat radiation portion 28 may be misaligned (on the second portion 42 of the heat exchanger plate 23) with the other heat radiation portions 28 of the plurality of heat radiation portions 28.

Furthermore, the battery heat radiation system 11 is not limited to the above-described embodiments proper, but in an implementation stage, can be embodied with components of the battery heat radiation system 11 varied without departing from the spirits of the embodiments. Moreover, various inventions can be formed by combining a plurality of the components disclosed in the above-described embodiments as needed. For example, some of all the components illustrated in the embodiments may be deleted. Moreover, components in different embodiments may be combined together as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Invention written in claims of PCT Application No. PCT/JP2014/074118, filed Sep. 11, 2014 is additionally noted below.

[1] A battery heat radiation system comprising:
a battery module;
at least one heat pipe thermally connected at a first end of the heat pipe to one surface of the battery module and protruding from the battery module at a second end of the heat pipe;

at least one heat radiation portion provided at the second end of the heat pipe; and an air blowing portion configured to blow air to the heat radiation portion.

REFERENCE SIGNS LIST

11 . . . battery heat radiation system, 12 . . . secondary battery pack, 14 . . . duct portion, 16 . . . air blowing portion, 21 . . . case, 23 . . . heat exchanger plate, 24 . . . first battery module, 25 . . . second battery module, 26 . . . first heat pipes, 26A . . . first end, 26B . . . second end, 28 . . . heat radiation portion, 31 . . . recessed portions, 33 . . . heat conducting sheet, 41 . . . first portion, 42 . . . second portion, 43 . . . first connection portion, 44 . . . second connection portion, 45 . . . coupling portion, 61 . . . seal member, 81 . . . first bracket, 83 . . . fixing member, 87 . . . first member, 88 . . . second member, D1 . . . direction crossing direction in which first heat pipes protrude and extending along heat exchanger plate, D2 . . . direction in which first heat pipes protrude

The invention claimed is:

1. A battery heat radiation unit comprising:
    a battery module;
    a heat exchanger plate comprising a first portion thermally connected to one surface of the battery module and a second portion extending in a direction crossing the first portion from a position of the first portion which protrudes from the battery module;
    a heat pipe comprising a first connection portion fixed to the first portion and thermally connected to one surface of the battery module and extending along the first portion, a second connection portion thermally connected to the second portion, and a coupling portion configured to couple the first connection portion and the second connection portion together; and
    a heat radiation portion provided on a first surface of the second portion,
    wherein the second portion includes a first member having a first recessed portion that comes into abutting contact with the second connection portion, with the heat radiation portion fixed to the first member, and a second member having a second recessed portion that comes into abutting contact with the second connection portion, and
    the second connection portion is sandwiched between the first member and the second member.

2. The battery heat radiation unit according to claim 1, comprising:
    a bracket configured to fix the battery module to the heat exchanger plate; and
    a fixing member configured to fix the second portion to the bracket.

3. The battery heat radiation unit according to claim 1, wherein the second portion is enabled to be installed on and removed from the first portion.

4. The battery heat radiation unit according to claim 3, wherein the second portion is fixed to the first portion in two different directions.

* * * * *